(12) United States Patent
Menig et al.

(10) Patent No.: US 12,636,207 B2
(45) Date of Patent: May 26, 2026

(54) AUXILIARY DRIVE DEVICE FOR A WHEELCHAIR

(71) Applicant: Alber GmbH, Albstadt (DE)

(72) Inventors: Joachim Menig, Bisingen (DE);
Miroslaw Rodewald, Bisingen (DE)

(73) Assignee: ALBER GMBH, Albstadt (DE)

( * ) Notice: Subject to any disclaimer, the term of this patent is extended or adjusted under 35 U.S.C. 154(b) by 525 days.

(21) Appl. No.: 18/095,649

(22) Filed: Jan. 11, 2023

(65) Prior Publication Data

US 2023/0142113 A1 May 11, 2023

Related U.S. Application Data

(63) Continuation of application No. 16/553,377, filed on Aug. 28, 2019, now Pat. No. 11,576,830.

(30) Foreign Application Priority Data

Sep. 13, 2018 (DE) ..................... 10 2018 122 360.9

(51) Int. Cl.
A61G 5/04 (2013.01)
A61G 5/10 (2006.01)
(Continued)

(52) U.S. Cl.
CPC ............. A61G 5/047 (2013.01); A61G 5/045 (2013.01); A61G 5/1051 (2016.11);
(Continued)

(58) Field of Classification Search
CPC .... A61G 5/047; A61G 5/045; B60B 33/0039; B60K 7/0007; B60K 26/02
(Continued)

(56) References Cited

U.S. PATENT DOCUMENTS 3,661,336 A * 5/1972 Lace ..................... G11B 23/04
242/336
4,759,418 A * 7/1988 Goldenfeld .......... A61G 5/1054
180/907
(Continued)

FOREIGN PATENT DOCUMENTS

DE 3818893 A1 7/1989
DE 4305592 A1 9/1993
(Continued)

OTHER PUBLICATIONS

Original document with english translation (WO-2014189189); paragraphs added for citation purposes. (Year: 2025).*
(Continued)

*Primary Examiner* — John Olszewski
*Assistant Examiner* — Nathaniel William Watkins
(74) *Attorney, Agent, or Firm* — Buchanan Ingersoll & Rooney PC

(57) ABSTRACT

An auxiliary drive device for a wheelchair has at least one freely pivotable electrically driven drive wheel and a coupling mechanism for coupling the auxiliary drive device to the wheelchair. The coupling mechanism includes a movable locking element which is movably supported in the coupling mechanism. The movable locking element can be in a locking position in which it causes locking in a positive-locking manner so that the auxiliary drive device is coupled to the wheelchair and, by operation of a handle, the locking element can be moved in a release position in which uncoupling of the auxiliary drive device from the wheelchair is possible.

10 Claims, 16 Drawing Sheets

(51) Int. Cl.

| | | |
|---|---|---|
| *A61G 5/12* | (2006.01) |
| *B60B 33/00* | (2006.01) |
| *B60K 7/00* | (2006.01) |
| *B60K 26/02* | (2006.01) |

(52) U.S. Cl.
CPC .......... *A61G 5/1054* (2016.11); *A61G 5/1097* (2016.11); *A61G 5/1083* (2016.11); *A61G 5/125* (2016.11); *A61G 2203/12* (2013.01); *A61G 2203/14* (2013.01); *A61G 2203/16* (2013.01); *A61G 2203/36* (2013.01); *A61G 2203/38* (2013.01); *A61G 2203/42* (2013.01); *B60B 33/0039* (2013.01); *B60K 7/0007* (2013.01); *B60K 26/02* (2013.01)

(58) Field of Classification Search
USPC .......................................................... 180/11
See application file for complete search history.

(56) References Cited

U.S. PATENT DOCUMENTS

| | | | |
|---|---|---|---|
| 5,016,720 A | 5/1991 | Coker |
| 5,291,959 A | 3/1994 | Malblanc |
| 5,351,774 A | 10/1994 | Okamoto |
| 5,495,904 A | 3/1996 | Zwaan et al. |
| 5,762,154 A | 6/1998 | Hsu |
| 6,481,514 B2 * | 11/2002 | Takada ................... A61G 5/047 |
| | | | 180/11 |
| 6,615,937 B2 | 9/2003 | Richey, II et al. |
| 6,860,347 B2 | 3/2005 | Sinclair et al. |
| 6,899,192 B2 | 5/2005 | Chen et al. |
| 7,021,407 B2 | 4/2006 | Ruschke et al. |
| 7,117,967 B2 | 10/2006 | Kidd et al. |
| 7,275,608 B2 | 10/2007 | Lo |
| 7,479,607 B2 | 1/2009 | Sack et al. |
| 7,571,662 B2 | 8/2009 | Pickering et al. |
| 7,680,574 B2 | 3/2010 | Berg et al. |
| 7,983,822 B2 | 7/2011 | Koski |
| 8,065,051 B2 | 11/2011 | Chopcinski et al. |
| 8,264,338 B2 | 9/2012 | Leon |
| 8,311,713 B2 | 11/2012 | Szymczak et al. |
| 8,641,070 B2 | 2/2014 | Birmanns et al. |
| 8,777,251 B2 | 7/2014 | Jurkiewicz |
| 9,144,525 B2 | 9/2015 | Richter |
| 9,334,949 B2 | 5/2016 | Fett et al. |
| 9,395,076 B2 | 7/2016 | Wang et al. |
| 9,398,990 B2 | 7/2016 | Richter |
| 9,474,665 B1 * | 10/2016 | Chan ...................... A61G 5/125 |
| 9,581,090 B2 | 2/2017 | Yun et al. |
| 9,783,052 B2 | 10/2017 | Kim |
| 9,795,524 B2 | 10/2017 | Richter |
| 9,922,784 B2 | 3/2018 | Levay et al. |
| 9,999,557 B2 | 6/2018 | Diaz-Flores et al. |
| 10,167,051 B1 | 1/2019 | Richter et al. |
| 10,788,123 B2 | 9/2020 | Wang et al. |
| 11,491,988 B2 | 11/2022 | Inuzuka |
| 11,541,951 B2 | 1/2023 | Kosaki et al. |
| 11,576,830 B2 | 2/2023 | Menig |
| 11,642,256 B2 | 5/2023 | Menig |
| 2003/0089537 A1 | 5/2003 | Sinclair et al. |
| 2003/0116927 A1 | 6/2003 | Quigg |
| 2006/0183597 A1 | 8/2006 | Szymczak et al. |
| 2007/0074917 A1 * | 4/2007 | Jaenke ................... F16B 2/065 |
| | | | 180/65.1 |
| 2007/0100511 A1 | 5/2007 | Koerlin |
| 2007/0273207 A1 | 11/2007 | Dorn et al. |
| 2010/0138128 A1 | 6/2010 | Strothmann et al. |
| 2011/0264338 A1 | 10/2011 | Park et al. |
| 2012/0143393 A1 | 6/2012 | Peters et al. |
| 2012/0279789 A1 | 11/2012 | Brill et al. |
| 2012/0325575 A1 | 12/2012 | Jurkiewicz |
| 2013/0080015 A1 | 3/2013 | Strothmann et al. |
| 2013/0180468 A1 * | 7/2013 | Dutcher ............... A01K 15/023 |
| | | | 119/721 |
| 2013/0240271 A1 * | 9/2013 | Tallino ................. A61G 5/1054 |
| | | | 180/11 |
| 2014/0083225 A1 * | 3/2014 | Downs ..................... B62D 1/12 |
| | | | 74/471 XY |
| 2014/0262575 A1 * | 9/2014 | Richter .................. A61G 5/022 |
| | | | 180/11 |
| 2015/0209207 A1 | 7/2015 | Cooper et al. |
| 2016/0009339 A1 | 1/2016 | Biderman et al. |
| 2020/0324613 A1 | 10/2020 | Dalla Rosa et al. |

FOREIGN PATENT DOCUMENTS

| | | | | |
|---|---|---|---|---|
| DE | 19748201 C1 | 3/1999 |
| DE | 10040521 C2 | 11/2001 |
| DE | 20114733 U1 | 11/2001 |
| DE | 102006032843 A1 | 1/2008 |
| DE | 1020037710 A1 | 3/2012 |
| DE | 102016118032 A1 | 1/2018 |
| DE | 202018002476 U1 | 8/2018 |
| EP | 2530005 A1 | 12/2012 |
| EP | 3061435 A1 | 8/2016 |
| EP | 3173056 A1 | 5/2017 |
| WO | 2013006818 A2 | 1/2013 |
| WO | WO-2014189189 A1 * | 11/2014 | .......... A61G 5/0825 |
| WO | 2017158504 A1 | 9/2017 |
| WO | 2017175103 A1 | 10/2017 |

OTHER PUBLICATIONS

Original document with english translation (JP-2013180691); paragraphs added for citation purposes. (Year: 2025).*

Original document (TW M478972) with english translation; paragraphs added for citation purposes. (Year: 2025).*

Office Action issued by the U.S. Patent and Trademark Office in the U.S. Appl. No. 18/095,654, mailed Jun. 16, 2025, U.S. Patent and Trademark Office, Alexandria, VA. (9 pages).

Entire patent prosecution history of U.S. Appl. No. 16/553,377, filed Aug. 28, 2019, entitled, "Auxiliary Drive Device for a Wheelchair."

Office Action issued by the U.S. Patent and Trademark Office in the U.S. Appl. No. 18/085,898, mailed Jul. 8, 2025, U.S. Patent and Trademark Office, Alexandria, VA. (10 pages).

Office Action issued by the U.S. Patent and Trademark Office in the U.S. Appl. No. 18/095,650, mailed Jun. 26, 2025, U.S. Patent and Trademark Office, Alexandria, VA. (12 pages).

Notice of Allowance issued by the U.S. Patent and Trademark Office in the U.S. Appl. No. 18/095,650, mailed Dec. 9, 2025, U.S. Patent and Trademark Office, Alexandria, VA. (9 pages).

Notice of Allowance issued by the U.S. Patent and Trademark Office in the U.S. Appl. No. 18/085,898, mailed Nov. 4, 2025, U.S. Patent and Trademark Office, Alexandria, VA. (8 pages).

* cited by examiner 124
120
122

130
110
111
121
131

120

110

100

500

110

100

120

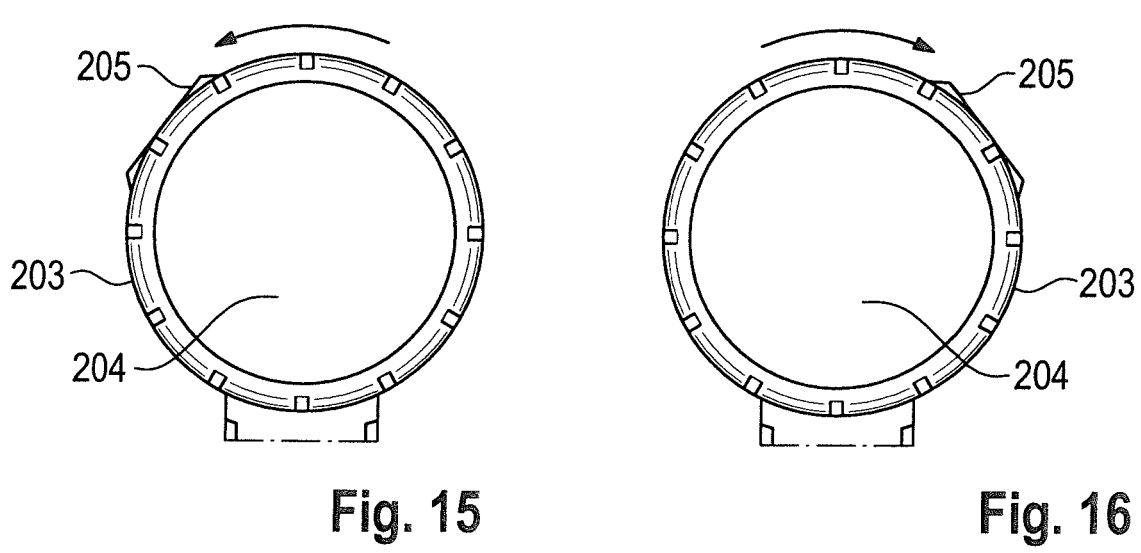
Fig. 15                    Fig. 16
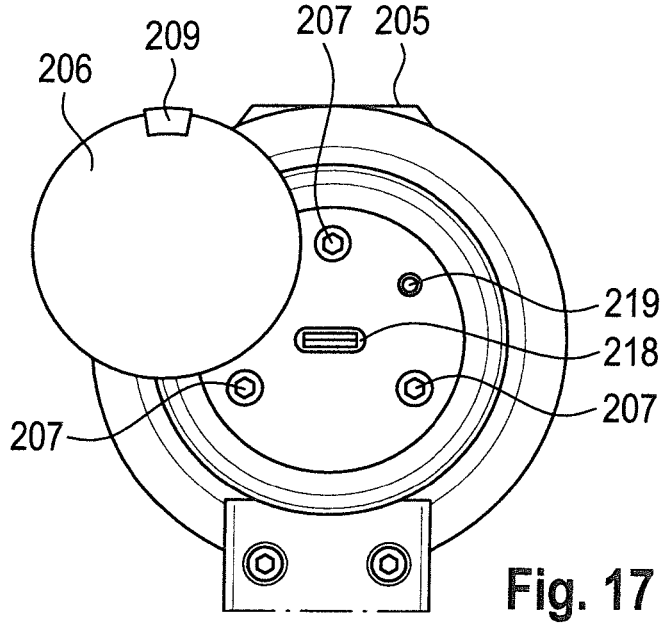
Fig. 17

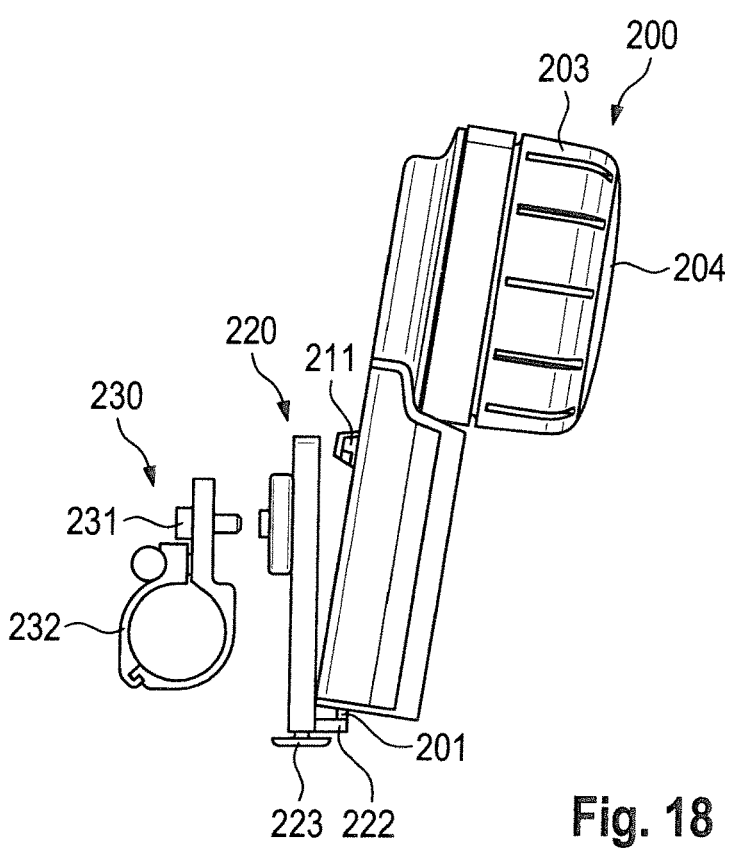
Fig. 18
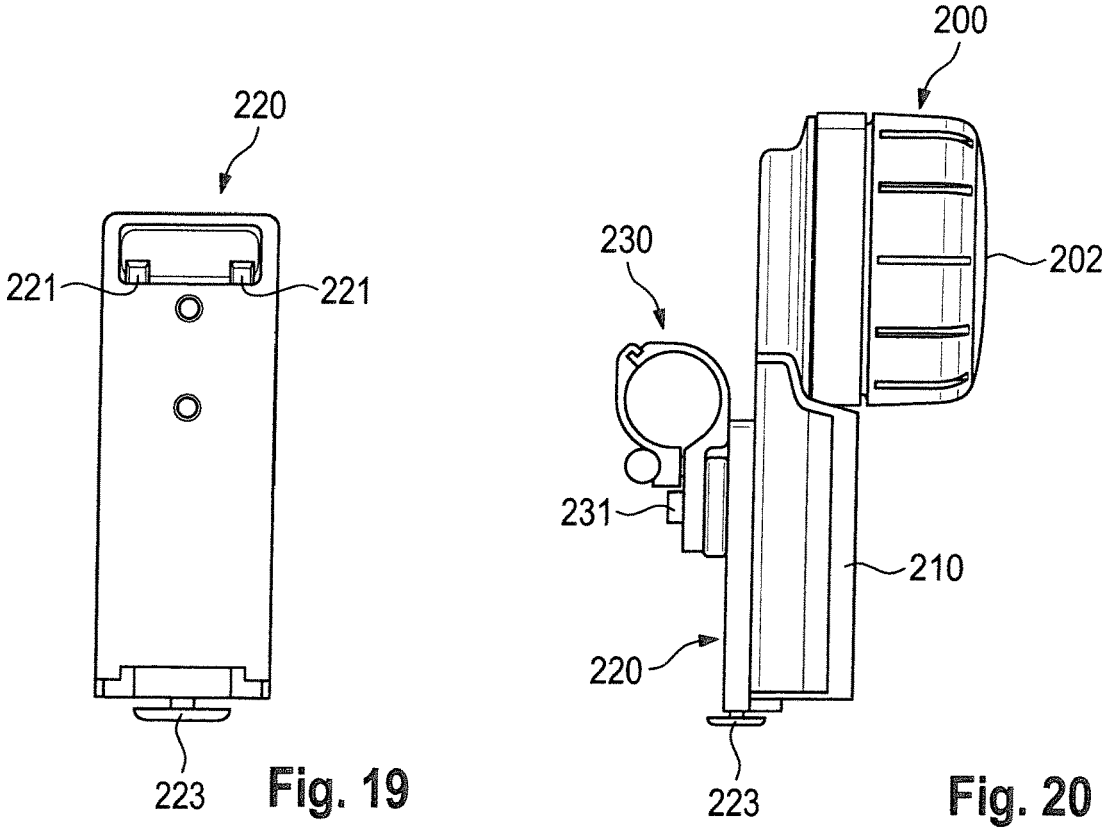
Fig. 19
Fig. 20

AUXILIARY DRIVE DEVICE FOR A WHEELCHAIR

CROSS-REFERENCE TO RELATED APPLICATIONS

The present application is a U. S. Continuation Application of U.S. patent application Ser. No. 16/553,377, filed Aug. 28, 2019, which claims priority from German patent application No. DE 10 2018 122 360.9 filed on Sep. 13, 2018, the entire contents of which are hereby incorporated by reference.

BACKGROUND OF THE INVENTION

The technology relates to an auxiliary drive device for a wheelchair.

Wheelchairs basically can be grouped into two categories, namely on the one hand wheelchairs which primarily are designed for manual drive, that is a drive provided by either the person sitting in the wheelchair, this being done by hand, for instance via pushrims, which are mounted at the large rear wheels of the wheelchair, or by an assisting person pushing the wheelchair, and, on the other hand, such wheelchairs which already from their original concept are designed for electric drive.

Manually driven wheelchairs in general are characterized by a considerably lower weight as compared with those wheelchairs where an electric drive unit is permanently installed. Furthermore, manually driven wheelchairs often are designed as so-called folding wheelchairs which, not only due to their lower weight, but also due to the fact that they can be folded and therefore have smaller dimensions, can be easily transported, for instance in the trunk of a passenger car.

Manually driven wheelchairs have, if the propulsion is effected by the person sitting in the wheelchair, a therapeutic effect because providing the driving power constitutes a valuable physical exercise. On the other hand, when manually driving a wheelchair, wheelchair drivers doing so sometimes soon reach the limits of their physical capacities, especially when slopes are to be negotiated, when the wheelchair has to be maneuvered on difficult terrain or when long distances are to be covered. Furthermore, use of a manually driven wheelchair over a long time may lead to injuries because of repeated high strain and to premature signs of wear in muscles, tendons and joints. For this reason, auxiliary drive devices for wheelchairs have been developed which, when later being attached to a wheelchair, support the user in moving the wheelchair.

Such an auxiliary drive device for a wheelchair can for instance be provided by replacing the two original large rear wheels of the wheelchair by such rear wheels in which a hub motor is integrated. Such an auxiliary drive device for a wheelchair is for instance disclosed in DE 197 48 201 C1.

US 2014/0262575 A1 discloses a different kind of auxiliary drive device for a wheelchair, namely a device which comprises an additional drive wheel which can be driven electrically, that is a drive wheel which is not exchanged with an original wheel of the wheelchair but which is part of a separate device, which, in addition, comprises a coupling mechanism for coupling the auxiliary drive device to the wheelchair.

A coupling mechanism for coupling such an auxiliary drive device to a wheelchair must ensure safe and secure coupling. Furthermore, coupling and uncoupling should be easy to be accomplished and the coupling should be preferably such that in order to negotiate obstacles like a curb, so-called tipping or tilting of the wheelchair for clearing this obstacle, that is a lifting of the front wheels, should be possible.

SUMMARY OF THE INVENTION

It is desirable to provide an auxiliary drive device for a wheelchair which ensures safe and secure coupling where coupling and uncoupling can be accomplished easily.

An aspect of the technology provides an auxiliary drive device for a wheelchair which has at least one electrically driven drive wheel and a coupling mechanism for coupling the auxiliary drive device to the wheelchair. The coupling mechanism includes a locking element which is movably supported in the coupling mechanism. The movable locking element can be in a locking position in which it causes locking in a positive-locking manner so that the auxiliary drive device is coupled to the wheelchair. The locking element can be moved in a release position by operation of a handle. In this release position, uncoupling of the auxiliary drive device from the wheelchair is possible.

The locking in a positive-locking manner ensures positive locking during operation. This positive, form-fit locking is ensured regardless of which position the auxiliary drive device has with respect to the wheelchair to which it is coupled because the coupling is effected by the movement of the locking element in the locking mechanism. Furthermore, coupling and uncoupling can be accomplished easily because the movably supported locking element can be moved into the release position by operating the handle.

In one embodiment, this handle is designed and arranged such that it can be used to carry the auxiliary drive device with one hand.

BRIEF DESCRIPTION OF THE DRAWINGS

The accompanying drawings are included to provide a further understanding of the disclosure and are incorporated in and constitute a part of the specification. The drawings illustrate exemplary embodiments and, together with the specification, serve to explain principles and details of the disclosed technology.

FIG. 15 is a partial view of the operating satellite according to FIG. 13 in a first rotational position.

FIG. 16 is a partial view of the operating satellite according to FIG. 13 in a second rotational position.

FIG. 17 is a partial rear view of the operating satellite according to FIG. 13 where a cover element has been removed.

FIG. 18 is an exploded view of the operating satellite according to FIG. 13 having an operating satellite-wheelchair mounting element and an operating satellite locking element.

FIG. 19 is a view of an operating satellite mounting surface of the operating satellite locking element according to FIG. 18.

FIG. 20 is a combined depiction of the operating satellite according to FIG. 13 having the operating satellite wheelchair mounting element and the operating satellite locking element.

DETAILED DESCRIPTION OF THE INVENTION

In the following, some embodiments of the technology are described with reference to the accompanying drawings. Note that the following description is directed to illustrative examples of the technology and not to be construed as limiting the technology. Factors including, without limitation, numerical values, shapes, materials, components, positions of the components, and how the components are coupled to each other are illustrative only and not to be construed as limiting the technology. Further, elements in the following example embodiments which are not recited in most generic independent claims of the technology are optional and may be provided on an as-needed basis. The drawings are schematic and are not intended to be drawn to scale. Throughout the present specification of the drawings, elements having substantially the same function and configuration are denoted with the same numerals to avoid any redundant description.

Figure 1:
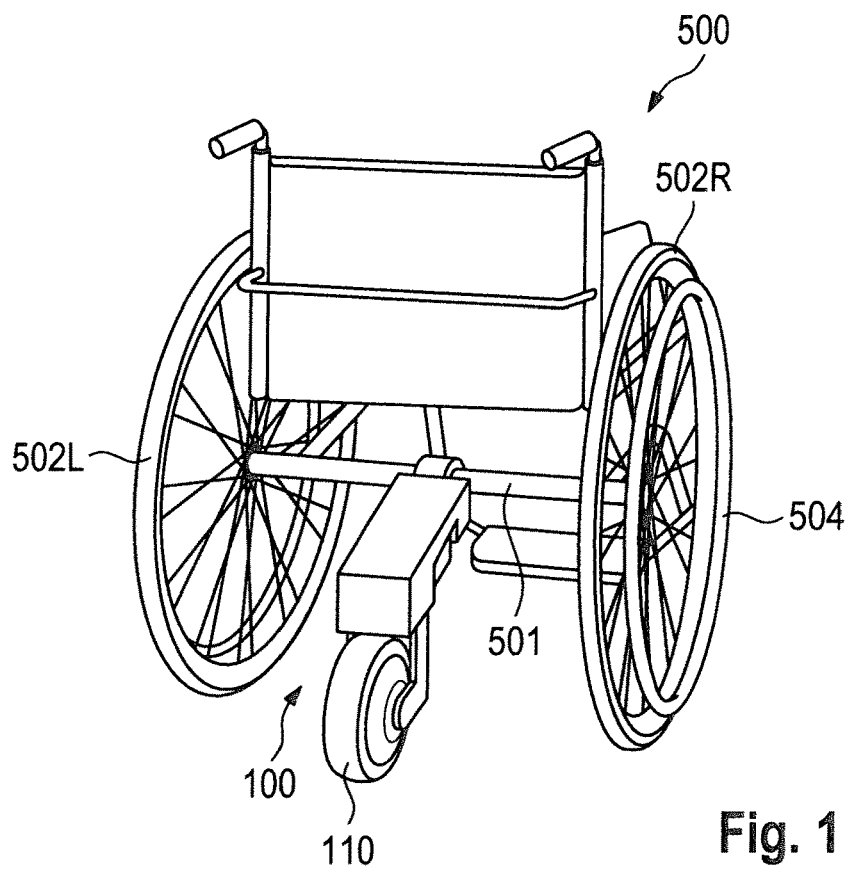
FIG. 1 is a perspective view of a first embodiment of an auxiliary drive device for a wheelchair which is coupled to the axis of a wheelchair.
Figure 2:
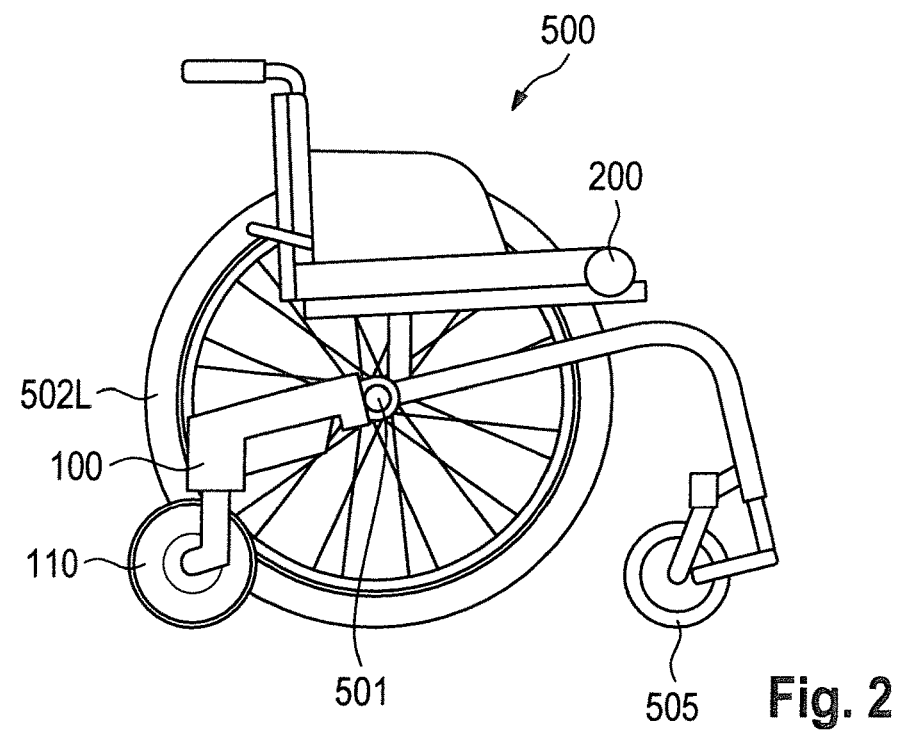
FIG. 2 is a side view of the auxiliary drive device according to FIG. 1 wherein parts of the wheelchair are omitted in the depiction.

FIG. 1 shows a perspective view of an embodiment of an auxiliary drive device 100 for a wheelchair which is coupled to an axis 501 of a wheelchair 500. In the embodiment as depicted, the axis 501 is the axis connecting the two large rear wheels 502, i.e. the left rear wheel 502L, as seen in the forward driving direction, and the right rear wheel 502R, as seen in the forward driving direction. As common in case of manually driven wheelchairs, pushrims 504 are mounted at both large rear wheels 502L, 502R. Via said pushrims 504, the wheelchair can be manually propelled and steered. Furthermore, the wheelchair 500 has two small and freely pivotable front wheels 505. FIG. 2 shows the embodiment of the auxiliary drive device 100 according to FIG. 1 in a side view wherein parts of the wheelchair 500, especially the right rear wheel 502R, are omitted in this depiction.

The auxiliary drive device 100 serves to be used as an auxiliary drive device for a wheelchair 500 which basically is intended to be manually driven. Details regarding the function of the auxiliary drive device 100 as well as the coupling to the wheelchair 500 and the structure of the respective coupling mechanism 300 are explained in detail further below.

General Structure of the Auxiliary Drive Device 100

Figure 3A:
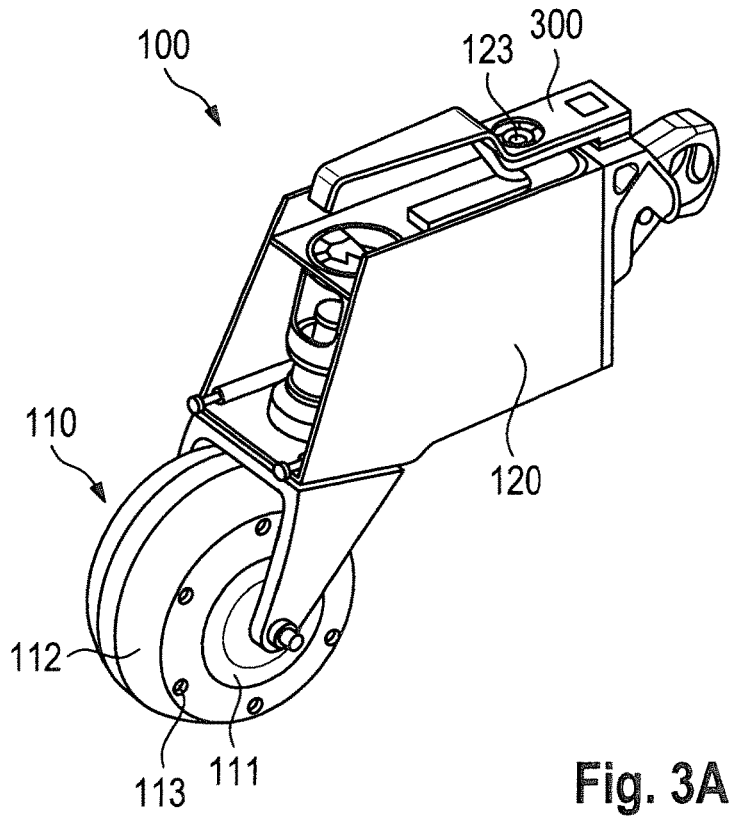
FIG. 3A is a perspective, partially cut-away view of a further embodiment of an auxiliary drive device for a wheelchair wherein the drive wheel of the auxiliary drive device is in a position for driving straight forward.
Figure 3B:
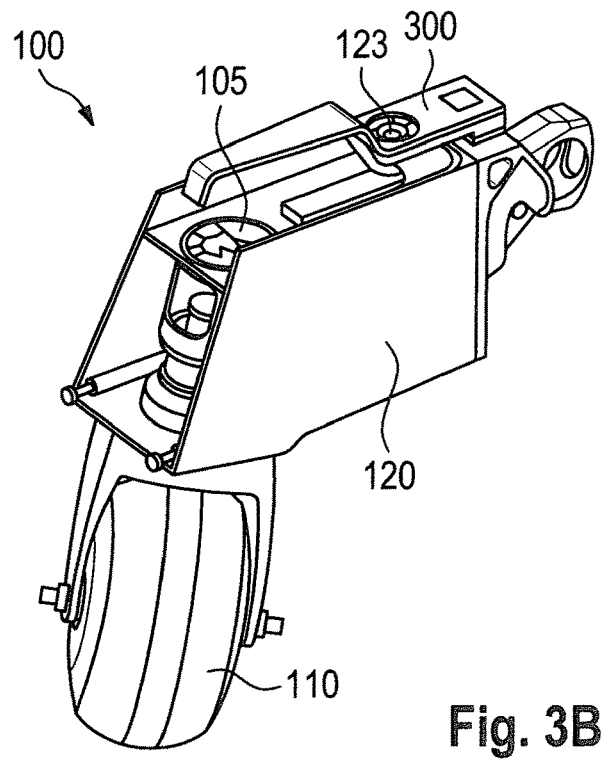
FIG. 3B is a further perspective, partly cut-away view of the auxiliary drive device according to FIG. 3A wherein the drive wheel of the auxiliary drive device is in a position for driving a curve in a state of forward driving.
Figure 4:
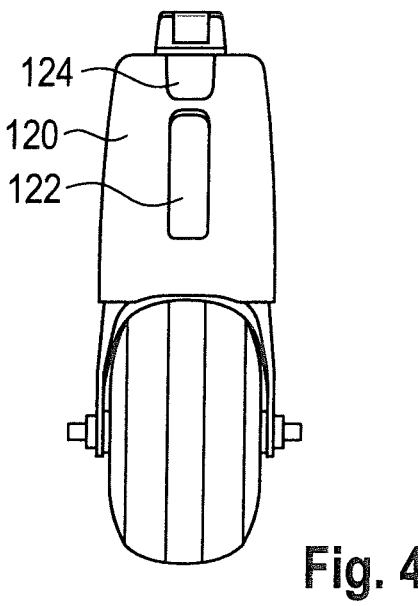
FIG. 4 is a back view of the auxiliary drive device according to FIGS. 3A, 3B.
Figure 5:
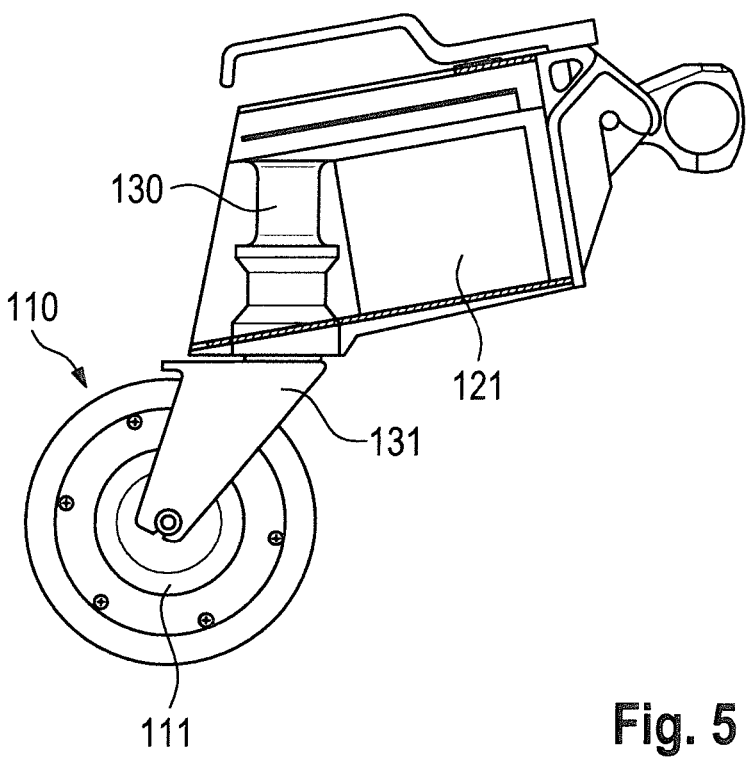
FIG. 5 is a partially cut-away side view of the auxiliary drive device according to FIG. 3 wherein the drive wheel of the auxiliary drive device is in a position for driving straight forward.

FIG. 3A is a perspective view of the auxiliary drive device 100 wherein the drive wheel 110 of the auxiliary drive device 100 is in a position for driving straight forward. FIG. 3B shows the auxiliary drive device 100 according to FIG. 3 in an operational condition in which the drive wheel 110 is in a position for driving a curve in a forward direction. FIG. 4 is a rear view of the auxiliary drive device 100 and FIG. 5 is a partially cut-away side view of the auxiliary drive device 100.

Main components of the auxiliary drive device 100 are inter alia a drive wheel 110, an auxiliary drive device main body 120 and a coupling mechanism 300. An operating satellite 200 is provided for controlling the auxiliary drive device 100 and its functions by a user.

The drive motor of the drive wheel 110 is an electric hub motor 111, for example a brushless DC motor with or without a gearing mechanism, which is integrated in the drive wheel 110. The tire surface 112 of the drive wheel 110 naturally is subject to wear. It is therefore an advantage if the tire can be replaced easily. In case of the embodiment as shown in the figures, the tire surface is split in the center, connected to the rotating part of the drive motor in a positive-locking manner and fixed from the side via tire surface bolts 113. It is noted that there are several other technical options for different kinds of connections, for example force-fitting connections like adhesion, which a person skilled in the art is aware of.

The electric hub motor 111 is connected via an electric conductor to a main power storage in the form of a rechargeable main battery 121 located in the auxiliary drive device main body 120. Further elements not shown in the figures are also located in the auxiliary drive device main body 120, for instance elements of a battery management system for managing the state of charge, particularly the charging and discharging of the main battery 121, elements of a power and control unit, i.e. an electronic control device for controlling the functions of the auxiliary drive device 100, particularly the electric hub motor 111, as well as further electric components of the auxiliary drive device 100, for example a rear light 122, which for instance can be provided in the form of a band of LED lighting elements glued to said band, which can be supplied with power from the rechargeable main battery 121. At a suitable position of the auxiliary drive device main body 120, there can also be provided a main switch 123 for switching the auxiliary drive device 100 to an OFF-state and a ready-to-operate state as well as a main body charging socket 124, for example in the form of a USB socket, which is connected in particular to the rechargeable main battery 121.

The power and electronic control unit is also connected to the operating satellite 200 which, as well as its functions and the sensors used therefore, will be explained in more detail further below.

FIGS. 1 and 2 show the coupling of the auxiliary drive device 100 at the axis 501 of the wheelchair 500 which allows a pivotal movement of the auxiliary drive device 100 in a plane which is vertical to the axis 501 but not a pivotal movement in a plane in which the axis 501 lies, i.e. which the axis 501 is part of. Accordingly, the drive wheel 110 has to allow a steering operation if lateral slip of the drive wheel 110 is to be avoided when the wheelchair negotiates a curve. In case of an auxiliary drive device as disclosed in US 2014/0262575 A1, such drivability of the drive wheel which is arranged in a rigid manner with respect to the wheelchair is provided by lateral rollers arranged along the circumference of the drive wheel.

In case of the embodiment of an auxiliary drive device 100 according to the present technology as shown in the figures and as described here, a completely different technical solution is chosen. The drive wheel 110 of the auxiliary drive device 100 is freely pivotable, which means, that its running direction with respect to the wheelchair 500 is self-adjusting when the auxiliary drive device 100 is coupled to the wheelchair 500. In order to provide this function, a steering shaft 130 is provided to which the drive wheel 110 is connected. In one embodiment, the drive wheel 110 is supported in a steering fork 131 which is fixedly attached to the steering shaft 130. It has to be noted that a person skilled in the art is aware of various different technical means to connect the drive wheel 110 to the steering shaft 130.

The steering shaft 130 is rotatably supported in the auxiliary drive device main body 120 and specifically in such a manner that it can be rotated without hindrance over a wide range of rotation. In an advantageous embodiment, the steering shaft 130 can be rotated without any hindrance over a range of rotation of at least 360°, in a specific embodiment over a range of rotation of for instance 380°. In other words, the steering fork 131 and, together with it, the drive wheel 110 supported therein, can be freely pivoted with respect to the auxiliary drive device main body 120 and, when the auxiliary drive device 100 is coupled to a wheelchair 500, also with respect to the wheelchair 500.

In one embodiment, the auxiliary drive device main body 120 is coupled to the wheelchair 500 for operation of the auxiliary drive device 100 such that the steering shaft 130 and the drive wheel 110, when the latter is in a position for driving straight forward, lie in a plane which is in the center between the two rear wheels 502R, 502L.

In one embodiment, the steering shaft 130 is, when the auxiliary drive device 100 is coupled to the wheelchair 500 in a state ready to be operated, in a position which ideally is perpendicular to the ground surface on which the wheelchair 500 stands. In other words, when the wheelchair 500 stands on a flat and horizontal surface, the steering shaft 130 stands perpendicular to this flat and horizontal surface, i.e. vertically (see FIG. 6), when the auxiliary drive device 100 is coupled to the wheelchair 500 ready to be operated.

Preferably, the deviation from this ideal case concerning the vertical position should not be larger than 5°, in a specifically preferred embodiment it should not be larger than 3°.

Figure 6:
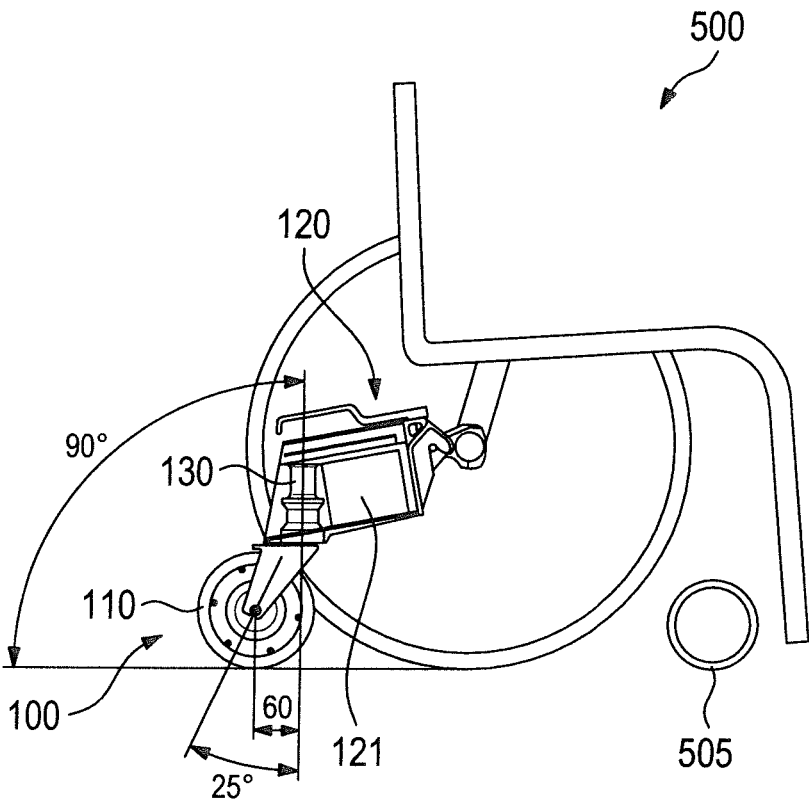
FIG. 6 is a view according to FIG. 5 with a coupled wheelchair being depicted only schematically wherein the drive wheel of the auxiliary drive device is in a position for driving straight forward.
Figure 7:
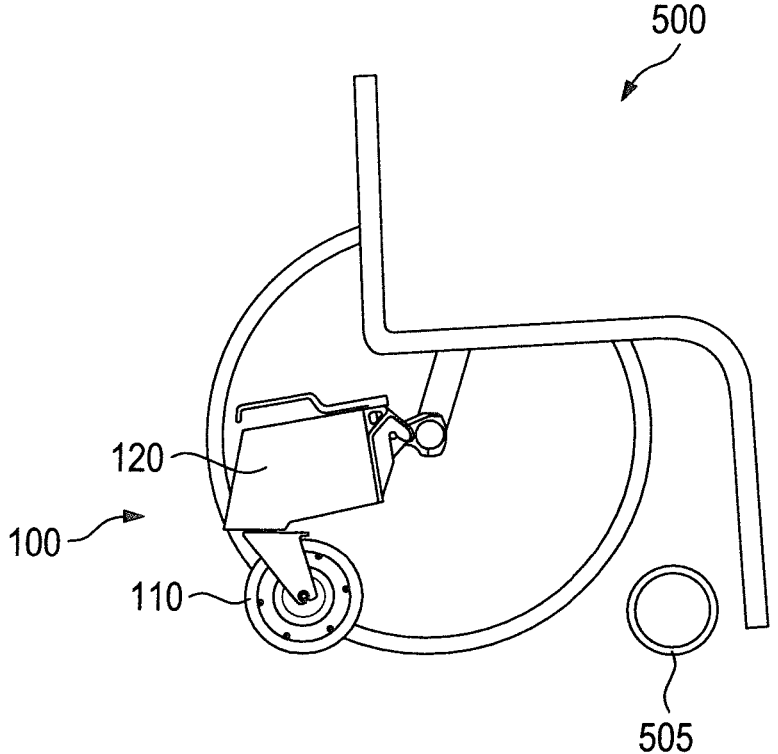
FIG. 7 is a schematic view according to FIG. 6 wherein the drive wheel of the auxiliary drive device is in a position for driving straight backwards.
Figure 8:
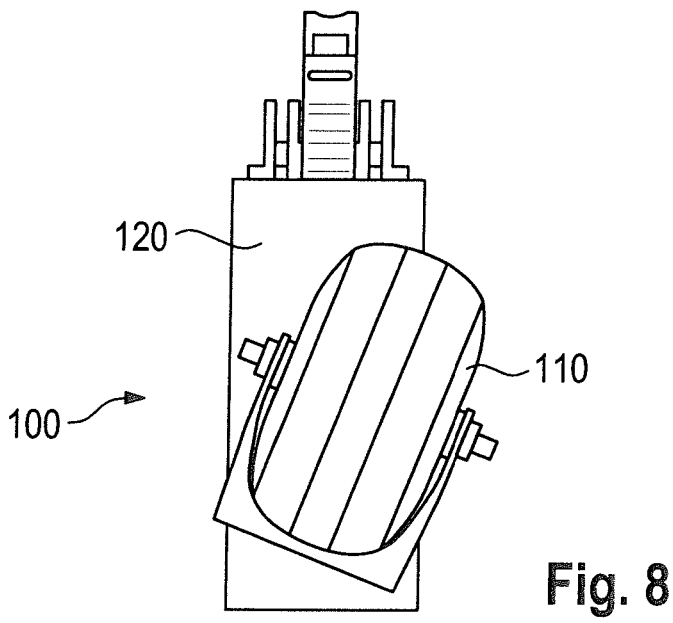
FIG. 8 is a view of the auxiliary drive device according to FIG. 3 taken from below wherein the drive wheel of the auxiliary drive device is in a position for driving a curve in a backwards direction.
Figure 9:
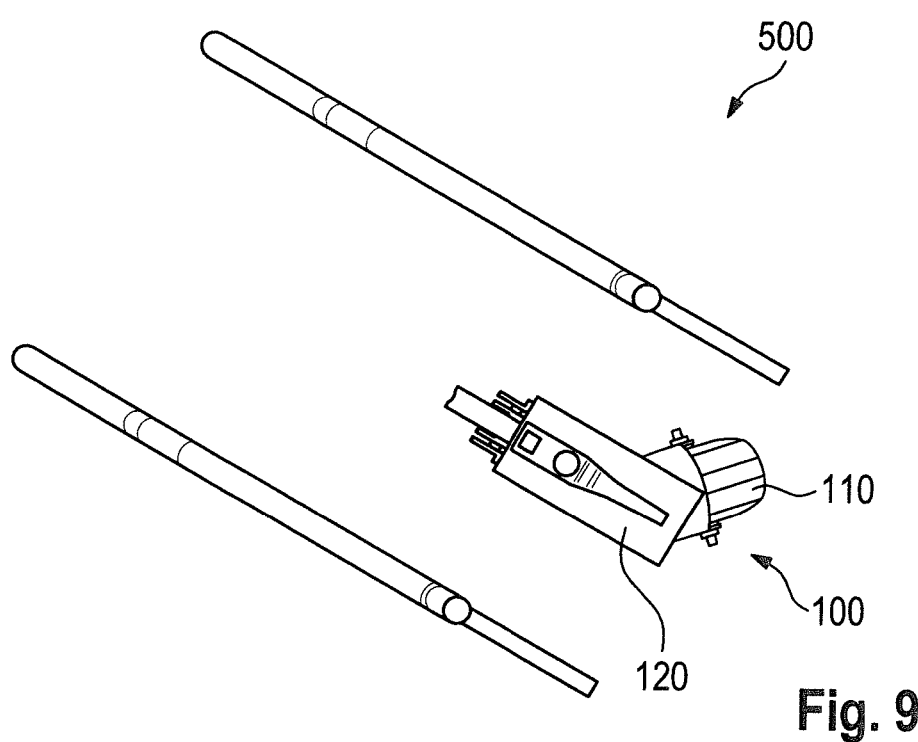
FIG. 9 is a top view of the auxiliary drive device according to FIG. 3 wherein lateral elements of the frame of the wheelchair coupled to it are shown only schematically and the drive wheel of the auxiliary drive device is in a position for driving a curve in the forward direction.

A further geometric feature of the embodiment according to FIG. 6 is that an imaginary line extending through the axis of rotation of the drive wheel 110 and the axial center of the steering shaft 130 is inclined with respect to the steering shaft 130, i.e. the center axis of the steering shaft 130 in an angle of about 25°, and that in a preferred embodiment this angle is not deviated from by more than 5°, in a specifically preferred embodiment not more than 3°, and that a castor is provided, which means that the distance from a vertical line extending through the axis of rotation of the drive wheel 110 to the horizontal contact surface of the wheelchair 500 to the steering shaft 130, i.e. the center line of the steering shaft 130, is for example 60 millimeter and that in a preferred embodiment the deviation from this value is not more than 20 millimeter, in a specifically preferred embodiment not more than 10 millimeter. Furthermore, in the embodiment as described here, the contact point of the drive wheel 110 with the ground surface is, in each rotational position of the steering shaft 130, behind the contact point of the rear wheels 502R, 502L, if seen in a forward driving direction of the wheelchair 500.

Although the drive wheel 110 is freely pivotable due to the freely pivotable steering shaft 130, in operation, that is when the auxiliary drive device 100, powered by the electric hub motor 111, propels the wheelchair 500 to which the auxiliary drive device 100 is connected, said drive wheel 110, in a self-acting manner, takes a position which allows a steering of the wheelchair by the user via the pushrims 504 without any problems. The drive wheel 110 automatically aligns itself in the direction of the curve which is defined by respective manual action via the pushrims 504 of the two rear wheels 502R, 502L. This includes driving on a straight both in forward and backward direction, driving curves of any radius and even turning the wheelchair on the spot.

It is to be noted that auxiliary drive devices of the present kinds have to be suited to be mounted to a variety of wheelchairs. On the other hand, wheelchairs are designed in accordance with the physical dimensions of the user. This leads to the fact that inter alia the seating height of the wheelchairs and particularly the diameter of the rear wheels 502R, 502L vary. Accordingly, also the height of an axle bar connecting the rear wheels 502R, 502L varies. Typical wheelchairs commercially available have usually rear wheels with a diameter of for instance 22", 24", 25" or 26". In accordance with this customary increments, various variants of the steering fork 131 can be provided for adapting the auxiliary drive device 100 to the dimensions of a given wheelchair, specifically with respect to the geometrical aspects as explained above. Since in many cases medical aids are used in a plurality of applications and auxiliary drive devices of the present kind during their life cycle may be mounted to various wheelchairs, easy replacement of respective components to be adapted constitute an important economic factor.

Steering Motion and Power Supply

As explained above, it is advantageous if the drive wheel 110 can assume any pivotable position which means that the steering shaft 130 can freely rotate, preferably over 360°. However, this basically includes the possibility that the steering shaft 130 rotates several subsequent times in the same direction of rotation.

As also explained above, the electric hub motor 111 is connected via an electrical conductor to the rechargeable main battery 121 which is arranged in the auxiliary drive device main body 120. If this electrical conductor is provided by a cable, care has to be taken that a plurality of rotations of the steering shaft 130 in the same direction does not lead to a winding of the cable which finally would hinder the rotatability of the steering shaft and, accordingly, would interfere with the operability of the auxiliary drive device 100.

Figure 10:
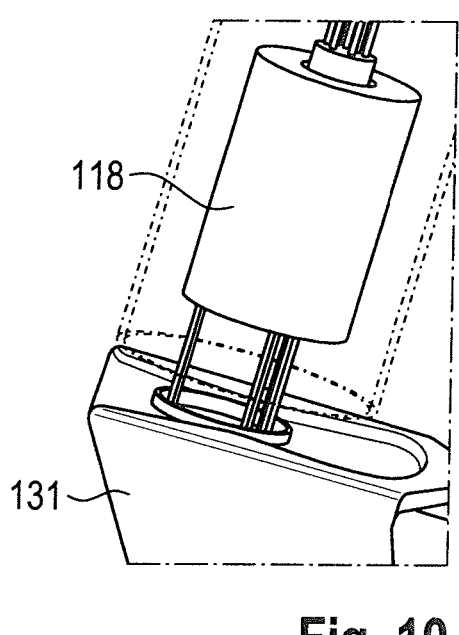
FIG. 10 is a partially cut-away perspective view of a further embodiment of an auxiliary drive device for a wheelchair.

In one embodiment, power transmission can be provided via a slip ring 118 in a position where a rotating component and a fixed component have to be bridged. Such an embodiment is shown in FIG. 10.

Figure 11:
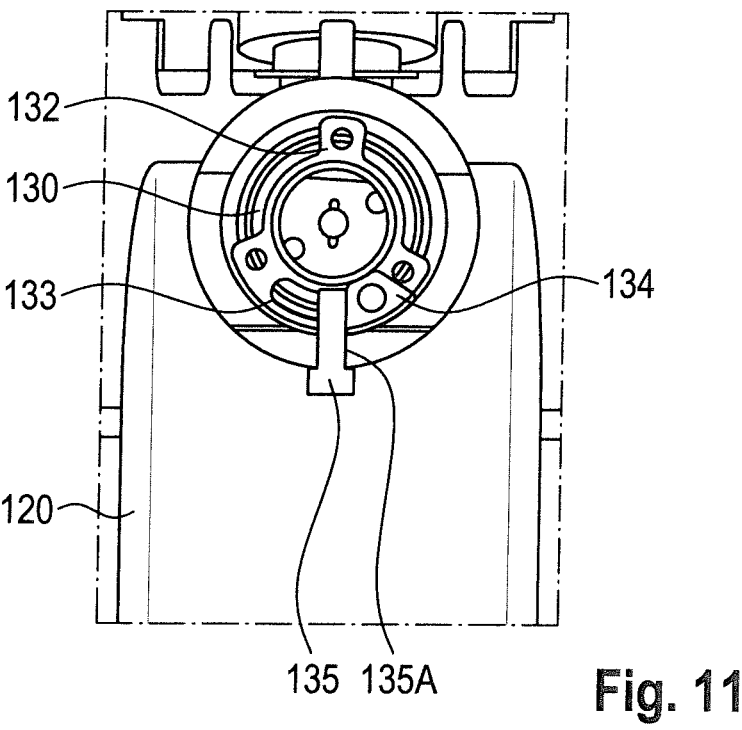
FIG. 11 is a view of a detail of an embodiment of an auxiliary drive device for a wheelchair where the drive wheel is in a first stop position.
Figure 12:
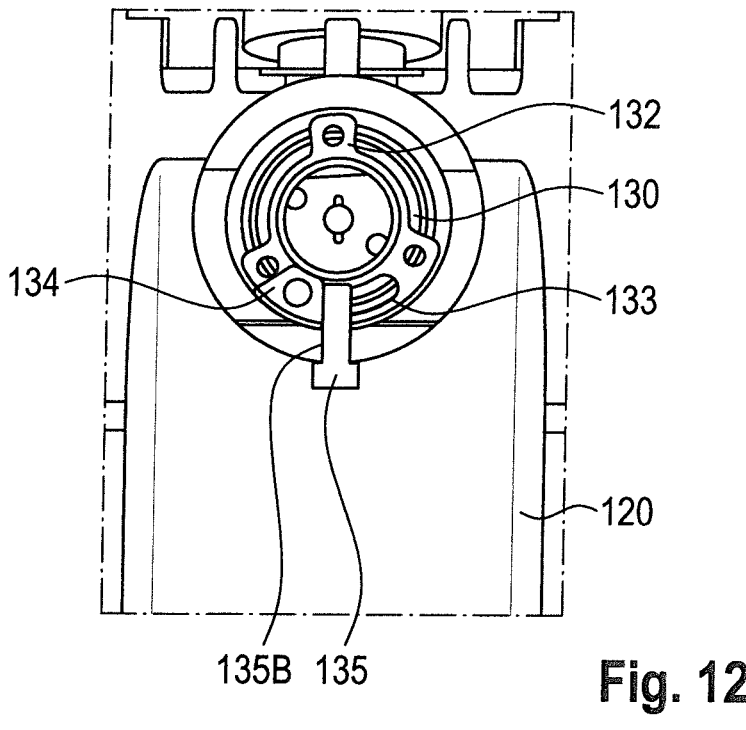
FIG. 12 is a view of a detail of the embodiment of the auxiliary drive device according to FIG. 11 where the drive wheel is in a second stop position.

Another embodiment includes a stop for the rotation of the steering shaft 130 which allows preferably more than a rotation over 360°, however prevents a plurality of sequential full rotations in one and the same direction. Such an embodiment is shown in FIGS. 11 and 12. A stop gliding element—guiding element 132 which is fixedly connected to the steering shaft 130 has a crescent-shaped elongated hole 133 in which a stop gliding element 134 is movably guided. When the steering shaft 130 is rotated in a first direction of rotation (see FIG. 11), the stop gliding element 134 gets in abutment of a first side 135A of a stop element 135 which is fixedly arranged with respect to the auxiliary drive device main body 120, wherein it rests against a first end of the elongated hole 133. When the steering shaft 130 is rotated in a direction opposite to the first direction of rotation (see FIG. 12), the stop gliding element 134 gets in contact with a second side 135B of the stop element 135, wherein it rests against a second end of the elongated hole 133.

Due to the movability of the stop gliding element 134 in the elongated hole 133, with appropriate choice of the dimensions of the respective components, it can be achieved that the steering shaft 130 can be rotated over a range of for instance 380° before it gets in abutment.

This makes it possible that the drive wheel 110 can be pivoted by more than 360° and, therefore, can assume all directions which preferably are desired for a driving operation and, on the other hand, it is still avoided that the steering shaft 130 rotates several times subsequently in the same direction so that winding of a power cable which connects the drive motor 111 to the rechargeable main battery 121 in the auxiliary drive device main body 120 is prevented.

Motion-Based System and Operating Satellite

In one embodiment, the auxiliary drive device 100 can be operated as a purely motion-based system, i.e. a system in which a motion, specifically of the drive wheel 110, is detected and this motion then is supported or amplified, respectively, by the electric motor. If, for instance, the wheelchair 500 to which the auxiliary drive device 100 is coupled to, is manually propelled by the user via the pushrims 504 at the rear wheels 502R, 502L in a direction for driving forward, the power and the electronic control unit for controlling the functions of the auxiliary drive device 100 detects this motion via respective sensors, which include, without limitation, one or more of the following sensors, namely a rotational speed sensor, which detects the rotational speed and the direction of rotation of the drive wheel 110, and/or one or more acceleration sensors which detect acceleration in various spatial directions, a gyro sensor and further optical, capacitive or inductive sensors, as the case shall be also a steering shaft rotational angle sensor 105 (see FIG. 3B) which detects the position of the steering shaft 130, and controls the hub motor 111 in order to provide electromotive rotation in the detected direction.

In another embodiment, operation is effected via an operating satellite 200 to be operated by the user. It is to be noted that this embodiment also can have one or more of the sensors as listed above which can be used in addition or alternatively also for other functions. The structure of this embodiment is explained in the following. A description of the operating functions and the drive follows subsequently.

An embodiment of the operating satellite 200 is shown in FIGS. 13 to 20. One of various positions where the operating satellite 200 can be attached to a wheelchair 500, preferably in a removable manner, as shown in FIG. 2.

Figure 14:
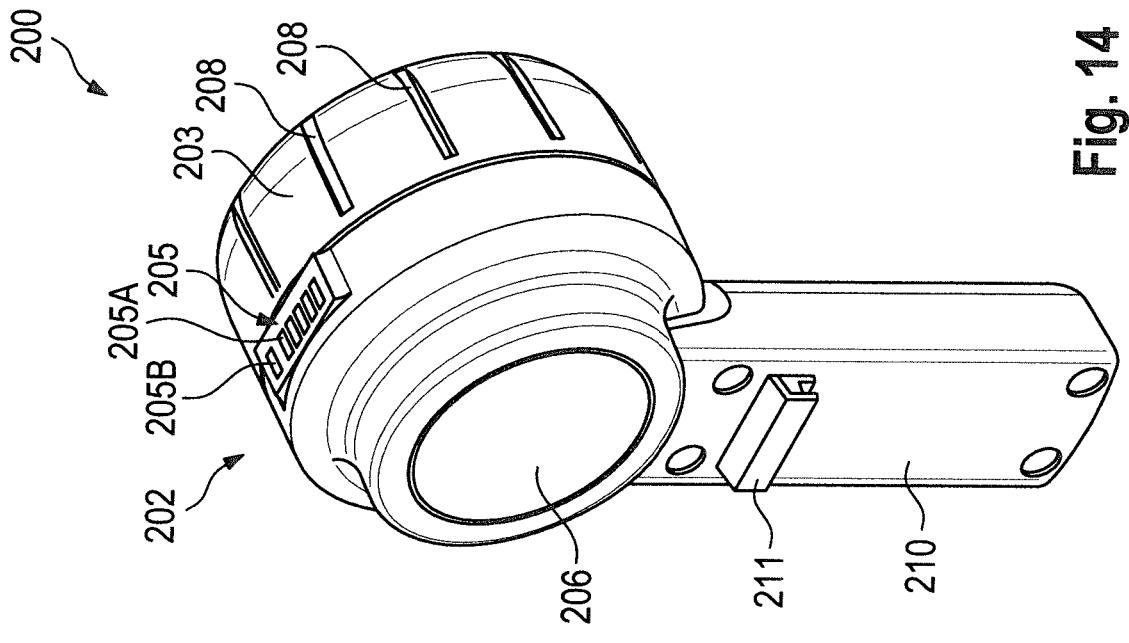
FIG. 14 is a perspective rear view of the operating satellite according to FIG. 13.
Figure 13:
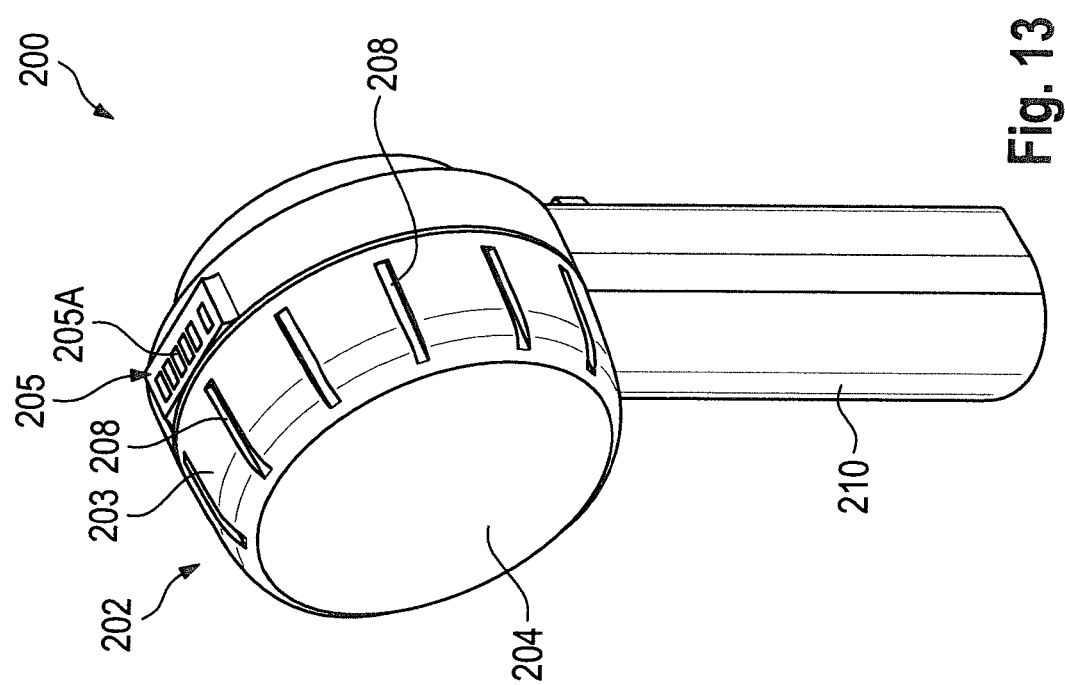
FIG. 13 is a perspective front view of an embodiment of an operating satellite.

FIGS. 13 and 14 show, each in a perspective view, a front view and a rear view of an embodiment of an operating satellite 200. The operating satellite 200 serves for controlling the auxiliary drive device 100 and has, specifically inside of it, the electric and electronic components necessary for this purpose (not shown in the figures) which for the further description of this embodiment in the following are summarized under the term operating satellite control unit. Bidirectional communication between the operating satellite control unit of the operating satellite and the electronic control unit for controlling the functions of the auxiliary drive device 100 can, for instance, be provided via wires and cables, not shown in the figures, or wireless, for instance by a Bluetooth coupling.

The operating satellite 200 has an operating satellite control portion 202 and an operating satellite mounting element 210.

The operating satellite mounting element 210 serves for mounting the operating satellite 200 to a wheelchair 500. For this purpose, a quick release unit can be latched with an operating satellite mounting pivot element 220 by hooking an undercut 201 of the operating satellite mounting element 210 in a fixing hook 222 of the operating satellite mounting pivot element 220. Then, the operating satellite mounting element 210 is brought in abutment with the operating satellite mounting pivot element 220 so that a locking hook 211 provided at the operating satellite mounting element 210 snaps into place with spring-loaded latches 221 at the operating satellite mounting pivot element 220 (see, also with respect to respective start up slopes, FIGS. 18 to 20). Releasing the operating satellite mounting element 210 from the operating satellite mounting pivot element 220 is done in a reverse sequence wherein the spring-loaded latches 221 of the operating satellite mounting pivot element 220 can be retracted (i.e. lowered down), by means of a release button 223 which is also spring-loaded and which is connected to the spring-loaded latches 221 of the operating satellite mounting pivot element 220 via a reverse mechanism.

Figure 21:
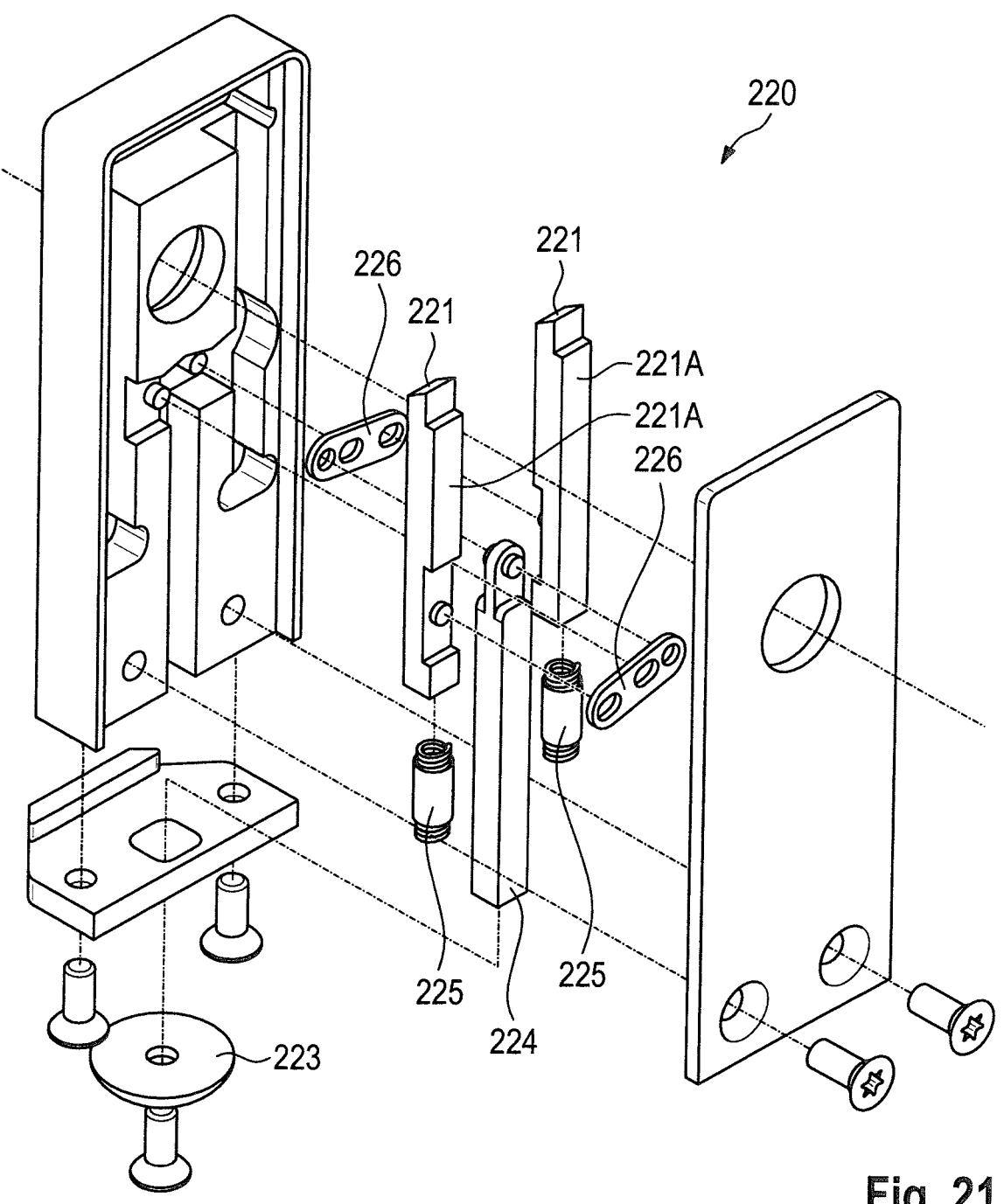
FIG. 21 is an exploded view of a reversing mechanism of an operating satellite mounting tilting element.
Figure 23:
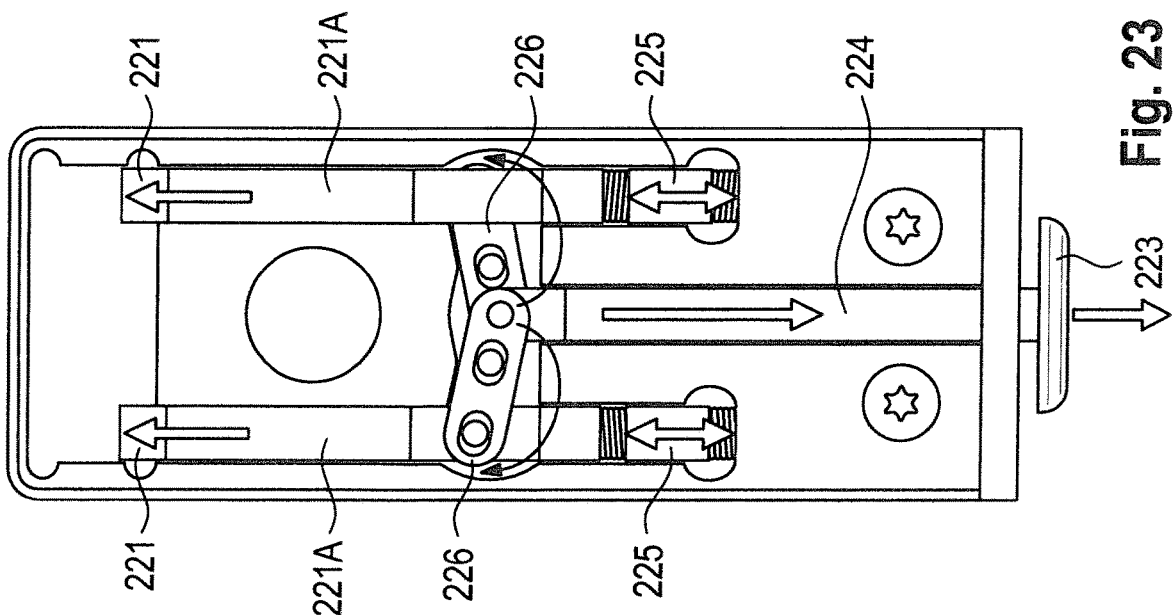
FIG. 23 is a schematic view of a latch position of latches of an operating satellite mounting tilting element.
Figure 22:
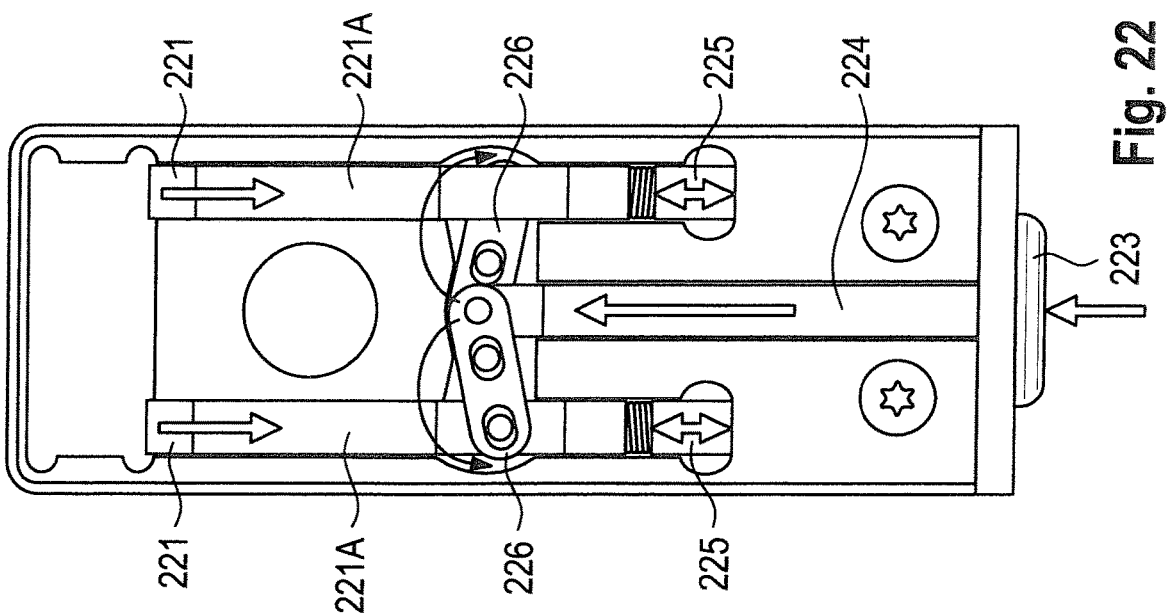
FIG. 22 is a schematic view of a released position of latches of an operating satellite mounting tilting element.

As shown in FIGS. 21 to 23, the two latches 221 at the upper ends of respective latch bars 221A are pushed each via a respective pressure spring 225 in the latch position as shown in FIG. 23 and are connected via reverse levers 226 to a push rod 224 which in turn is connected to a release button 223. If, starting out from the latch position as shown in FIG. 23, the release button 223 is pushed against the spring force of the pressure springs 225 in the direction towards the housing of the operating satellite mounting pivot element 220, the latch bars 221A are shifted due to the reverse levers 226 in the opposite direction of the push rod 224 and cause a lowering of the latches 221 so that the operating satellite mounting pivot element 220 is released. This condition of a release position of the latches 221 is shown in FIG. 22. If the release button 223 is released, the latches 221 return, due to the pressure force of the pressure springs 225, back into their latch positions according to FIG. 23.

The operating satellite mounting pivot element 220 can be connected to a wheelchair mounting element 230 in a rotational position which can be freely determined and can be fixed by a mounting bolt 231 in this freely determinable position. Due to the structure as described above and shown in the figures, there is a great variety of possible positions for attaching the operating satellite 200 to a wheelchair 500 and for choosing appropriate positions for such attachment. In particular, it is possible to select either the right side or the left side of the wheelchair for such attachment which allows easy operation for left-handed persons and right-handed persons, respectively.

The operating satellite control portion 202 has control and switching elements by which via respective actuation processes the control and drive of the auxiliary drive device 100 can be effected. Specifically, these processes can be effected via a rotational control ring 203 which is arranged at the outer circumference of the operating satellite control portion 202 and provided with grip links 208 and a push control knob 204 within the outer circumference of the operating satellite control portion 202 and, thus, also within the outer circumference of the rotational control ring 203. The push control knob 204 can be pushed in the direction of the axis of rotation of the rotational control ring 203 and is designed having a considerable surface and is attached upon mounting at the wheelchair with the face surface of the operating satellite control portion 202 facing to the outside of the wheelchair (not facing to the center of the wheelchair) and therefore also at the outer part of the push control knob 204.

The rotational control ring 203 can be rotated in both directions of the circumference, that is clockwise and counter clockwise, with no limit. No respective abutment is provided. However, the rotational control ring 203 is provided with a clearly sensible ratchet which provides the user upon rotating this element with a tactile and/or audible operation feedback, thus providing distinctive increments of rotation. In other words, the rotational control ring 203 can be rotated arbitrarily far, over as many full rotations as desired, and in each direction. However, the angle range of 360° of a full rotation is divided in a certain number of sub-ranges, namely the above-mentioned increments provided by the ratchets, so that each time when such a sub range is exceeded, a respective ratchet is sensible and/or audible.

Exceeding such a sub range or increment triggers a signal of the operating satellite control unit which signal can be defined in a program with respect to its characteristics and is transmitted to the electronic control unit for controlling the functions of the auxiliary drive device 100, wherein also the direction of rotation of the operation influences the content of the signal.

Details concerning the control functions which are transmitted to the electronic control unit for controlling the functions of the auxiliary drive device 100 by operating the operating satellite 200 are explained further below.

The push control knob 204 can be operated by pressing it in an inward direction against pressure force of a spring. Its operation also triggers a signal of the operating satellite control unit which is transmitted to the electronic control unit for controlling functions of the auxiliary drive device 100 wherein also the duration of the operation has influence on the content of the signals.

On the outer side of the operating satellite 200, in case of the shown embodiment on the outer circumference of the operating satellite control portion 202, there is provided a display device 205, for instance in the form of LED displays. This display device 205 displays information regarding operational conditions of the drive device or the auxiliary drive device 100, respectively, and informs, for example, in the shown embodiment regarding the state of charge of the main battery 121 in the auxiliary drive device main body 120, for instance by providing a strip of several white LED elements 205A wherein the number of luminous or lighted elements corresponds to the state of charge, and also concerning the state of charge of a rechargeable operating satellite battery (not shown) which is integrated in the operating satellite, for instance by a single RGB LED element 205B which communicates the state of charge by changing the color.

The display device 205 is designed such that its arrangement on the operating satellite can be adjusted, that is, it can be altered. This makes it possible to adjust the position of the display device 205 with respect to its visibility for a person sitting in the wheelchair 500 in connection with a respective place of attachment of the operating satellite 200 at the wheelchair 500. In the embodiment as shown in the figures, this is for instance achieved by the structure as described below.

A cover element 206 is provided at a face side of the operating satellite control portion 202 which, when mounted at a wheelchair 500, faces to the center of the wheelchair 500. This cover element 206 can be removed and also be fixed back in place by operating a spring-loaded unlocking element 209 (see FIG. 14 and FIG. 17). Removing the cover element 206 allows access to three fixing screws 207, to an adaptor charging socket 218 arranged at the operating satellite 200, for instance in the form of a USB socket, and to a pairing button 219.

Untightening the three fixing screws 207 allows rotating the outer circumference of the operating satellite control portion element 202 in a circumferential direction (see FIG. 15 and FIG. 16). The subsequent tightening of the three fixing screws 207 fixes the outer circumference of the operating satellite control portion 202 in the newly selected position with respect to the operating satellite mounting element 210. Hereby it can be ensured that, regardless at which part of the wheelchair 500 and in which position with respect to the wheelchair 500 the operating satellite 200 is attached, the display device 205 is always within sight of the user.

The adaptor charging socket 218 can be used for charging the operating satellite battery of the operating satellite 200 also upon operation, that is when the wheelchair travels supported by the auxiliary drive device 100, wherein the energy for this purpose can either be provided by a separate power source or by connection with the main body charging socket 124 provided at the auxiliary drive device main body 120.

The pairing button 219 serves to establish a Bluetooth connection with the electronic control unit in the auxiliary drive device main body 120 for controlling the functions of the auxiliary drive device 100.

Operating Function and Travel

In the following, as an example, operation of the auxiliary drive device 100 and the drive or travel of a wheelchair 500 connected to such an auxiliary drive device 100 are explained. It is understood that a plurality of amendments from this exemplary embodiment can be provided by a person skilled in the art.

Starting out from a nonoperating state, in which the auxiliary drive device 100 is switched OFF, the auxiliary drive device 100 is put into a ready to operate state by operating the main switch 123 at the auxiliary device main body 120. In the ready to operate state, the electronic control unit in the auxiliary device main body 120 for controlling the functions of the auxiliary drive device 100 receives signals from the operating satellite control unit provided in the operating satellite 200.

When in this ready to operate state of the auxiliary drive device 100 the push control knob 204 at the operating satellite control portion 202 of the operating satellite 200 is pushed for longer than a respective threshold value, which for instance can be 3 seconds, the auxiliary drive device 100 is put into a ready to drive state. If in this ready to drive state the rotational control ring 203 at the operating satellite control portion 202 of the operating satellite 200 is rotated in a first direction, for instance in, as seen from a user sitting in the wheelchair, a forward direction, the electronic control unit for controlling the functions of the auxiliary drive device 100 receives corresponding signals from the operating satellite control unit and drives the motor 111 such that a torque is delivered for rotating the drive wheel 110.

Turning of this control element, namely of the rotational control ring 203, is a direction sensitive operational process which causes, depending on the operational direction, an activation of the auxiliary drive device 100 corresponding to this operational direction wherein the correlation between the operational direction of the rotational control ring 203 and the activation of the auxiliary drive device 100 caused by this rotation can be changed.

For instance, the rotational direction of the rotational control ring 203 which initiates start of a drive can be changed, for instance by respective programming. This means that regardless of whether the operating satellite 200 is mounted on the left side or on the right side of the wheelchair 500, which for instance can be chosen depending on whether the user is left-handed or right-handed, the start of a drive always can be initiated by rotation in a forward direction which allows an intuitive operation. Such programming, just as also other options for programming which can be made by a user, can be done with the aid of an end terminal like for instance a PC or a smartphone where a respective software designed to run on a mobile device, in the following referred to as app, has been downloaded on, i.e. a respective user program which is provided to the user.

The level of the torque is set such that a respective travelling speed is achieved. The level of the travelling speed depends on how many ratchets (increments) have been exceeded when the rotational control ring 203 is rotated.

In other words, after switching ON into the ready to operate state by pushing the main switch 123 and switching ON to the ready to drive state by continued pushing of the push control knob 204, the user can start driving with electric power of the auxiliary drive device 100 by rotating the rotational control ring 203 in a forward direction. The speed of the drive is set by the user such that a certain number of ratchets (increments) are exceeded upon rotating the rotational control ring 203. In other words, if for instance, starting out from a stand still condition, the rotational control ring 203 is rotated such that five ratchets are exceeded, a predetermined speed will be reached. If in the same rotational direction another ratchet is exceeded, the speed will be increased by a predetermined amount. On the other hand, if the rotational control ring 203 will be rotated in an opposite direction, each time a ratchet is exceeded, the speed will be lowered to a lower by a predetermined amount.

The correlation between ratchet and speed is freely programmable wherein only an upper speed limit can be provided which cannot be changed by the user. The correlation between ratchet and speed is expressed in how many ratchets have to be exceeded in order to obtain a specific speed, namely an increase of the speed or a reduction of the speed. This adjustability makes it possible to change the response or sensitivity, respectively, of the rotational control ring 203 and thus adapt it to specific needs of various user groups and their level of handicap. This is a particular advantage for those users who have limited coordination ability because the adjustment movement then, as the case may be, can be executed more heavy-handed, that is in a kind of gross motor manner.

In one exemplary embodiment, the setting can be such that the upper speed limit is set to 12 km/h and the correlation between ratchet and speed is set such that exceeding one ratchet means a speed increase of 1 km/h. If, under such a condition, a user, starting from a standing still condition, rotates the rotational control ring 203 by one ratchet in a forward direction, the wheelchair 500 starts moving due to the electric drive power of the auxiliary drive device 100 with a driving speed of 1 km/h. Each further rotation of the rotational control ring 203 in a forward direction exceeding one further ratchet increases the drive speed by 1 km/h. In another exemplary embodiment, the setting for instance could be that each time a ratchet is exceeded the change in speed is only 0.5 km/h. If the set top speed is reached, which means that in the first example given above 12 ratchets are exceeded and in the second example 24 ratchets are exceeded, further rotation of the rotational control ring 203 in the forward direction is possible as far as the mechanics are concerned. However, it has no effect as far as control of the auxiliary drive device is concerned.

Turning the rotational control ring 203 in a backward direction decreases the speed in a corresponding manner, namely with a set speed increment each time a ratchet is exceeded. Turning the rotational control ring 203 in a backward direction therefore leads to a reduction in speed and, after a respective number of ratchets have been exceeded, it leads to complete stopping, that is to termination of the production of drive torque. Also, in this case it is possible to further rotate the rotational control ring 203 in a backward direction as far as the mechanics are concerned, however without any effect concerning control functions.

A complete stop is also possible by pushing the push control knob 204 during the drive. In this case, a short push is sufficient. This pushing of the push control knob 204, even if it is only for a short period of time, makes it possible to immediately terminate the production of drive torque.

If in the ready to drive condition of the auxiliary drive device 100 the push control knob 204 at the operating satellite control portion 202 of the operating satellite 200 is pushed for a longer duration than a respective threshold value, which threshold value for instance can be 3 seconds, the auxiliary drive device 100 is set back into the ready to operate state.

The above describes basic aspects of the operation of the auxiliary drive device 100 by means of respective electric and electronic components like switches, control elements and programming. In the following, operation and drive with a wheelchair 500 at which an embodiment of the auxiliary drive device 100 is coupled to is described.

As explained above, the drive wheel 110 is supported via the steering shaft 130 and can be freely pivoted with respect to the auxiliary drive device main body 120. Force is developed by the auxiliary drive device 100 basically only with respect to propulsion, i.e. with respect to the rotation of the drive wheel 110 by the hub motor 111. Steering is effected via the pushrims 504 at the rear wheels 502R, 502L such that when driving a curve is intended, by decelerating the inner rear wheel, i.e. the inside rear wheel of the intended curve. The freely pivotable drive wheel 110 then behaves with respect to its pivoting, in spite of the applied drive power, like a freely pivotable castor and aligns itself automatically corresponding to the curve.

The freely pivotable drive wheel 110 provides, especially as compared with a drive wheel which is rigidly installed with respect to the driving direction, superior maneuverability and allows simple initiation of driving a curve without the need of substantial force. Since the drive wheel 110 always by itself takes the position of the vector of this curve which is initiated manually via the pushrims 504 by one-sided deceleration, negotiating the curve is initiated easily also when power is provided from the auxiliary drive device 100. If one rear wheel of the wheelchair is completely stopped, this leads to turning on the spot. Furthermore, driving in a backward direction is possible in a position of the drive wheel which is opposite to the one for driving in a forward direction. The physical conditions which specifically include the freely pivotable drive wheel and the castor and, preferably, the coupling in the center, and the application of the power of the drive wheel 110 rearwards of the contact point of the large wheelchair wheels 502R, 502L provide responsive and agile handling and driving performance with little effort as far as manual forces are concerned.

Due to the fact that steering is effected via the pushrims 504 at the rear wheels 502R, 502L, attachment of the operating satellite is preferably done at a position which the hand of a user lying at the pushrim 504 can reach quickly and intuitively.

For all settings which can be done by a user it is possible, as explained above, to provide the option of a computer program installed on an end terminal, for instance a smartphone app or a PC service application. This does not only relate to the functional steps described above like the operation sensitivity of the rotational control ring 203. Also switching ON and switching OFF can be done by a user by means of a smartphone and a respective user application. If, for instance during traveling on public roads, it should be getting dark and switching ON of the rear light 122 should become necessary and a switch for switching ON the rear light 122 at the auxiliary drive device main body 120 should be difficult to be reached by a user or could not be reached at all, the user can switch ON the rear light easily while sitting in the wheelchair 500 by means a respective smartphone app. Carrying along a separate battery light for such cases is therefore not necessary.

Cornering Speed Limitation

In one embodiment of an auxiliary drive device propelling a wheelchair by electric power in the way described above, it is possible to reduce the cornering speed when a curve is negotiated.

Reducing the drive power especially in narrow curves can improve the controllability of the wheelchair, especially for wheelchair drivers having a higher spinal paralysis and limited function of the hand and fingers so that controlling the wheelchair under demanding drive conditions can be difficult. Particularly for such user groups, limiting the cornering speed or providing automatic reduction of the cornering speed can be a contribution to enhanced safety.

Appropriate reduction of the drive power, i.e. the driving torque of the motor 111 of the drive wheel 110, also can be useful during drive in narrow environments like indoors where hitting furniture and other objects must be avoided or in heavily frequented pedestrian zones. Generally, in narrow curves an appropriate reduction of the cornering speed can be an additional safety feature.

For realizing such cornering speed limitation, at least one sensor is provided which serves to detect cornering and/or the cornering speed. In one embodiment, the electronic control unit for controlling the functions of the auxiliary drive device 100 uses a plurality of respective sensors including, but not limited thereto, a steering shaft rotational angle sensor 105 (see FIG. 3B) which detects the position of the steering shaft 130, a rotational speed sensor detecting the rotational speed and the direction of rotation of the drive wheel 110, several acceleration sensors detecting accelerations in various spatial directions, a gyro sensor as well as optical, capacitive and/or inductive sensors, based on signals from one or more of these sensors, the hub motor 111 is driven such that electro motor drive torque is produced only in a manner which is suitable for the present driving situation.

A drive torque leading to a constant drive straight ahead for instance can be reduced depending on the detected radius of the curve wherein the reduction increases when the radius of the curve becomes smaller and/or the cornering speed increases.

Respective values can be stored in maps and the values can be determined in respective experiments. A control program stored in the electronic control unit for controlling the functions of the auxiliary drive device 100 then can, based on current sensor signals, refer to such map when conducting respective calculations. Alternatively, the control program can execute real-time calculation on the basis of respective signals from the sensors.

If for instance the steering shaft rotational angle sensor 105 which detects the position of the steering shaft 130 is, in addition to monitoring the driving speed, used as one of the main input values for the function of the cornering speed limitation, this sensor can permanently monitor the steering angle of the drive wheel 110.

Furthermore, settings can be made via a computer program or an external interface defining by which amount the drive power or the drive torque, respectively, shall be reduced depending on the radius of the curve or the steering angle. Moreover, in cases where the radius of the curve increases again and/or transition is made to driving straight ahead, the drive power or drive torque, respectively, can be increased automatically.

Coupling Mechanism (Structure)

The coupling of the auxiliary drive device 100 to the wheelchair 500 has to be safe and secure. Furthermore, coupling and uncoupling should be easy to be accomplished and the coupling should be preferably such that in order to negotiate obstacles like a curb, so-called tipping or tilting of the wheelchair for clearing this obstacle, that is a lifting of the front wheels, should be possible. One embodiment having a coupling mechanism 300 described below with reference to FIGS. 24 to 28, fulfils all these requirements.

The coupling mechanism 300 according to FIGS. 24 to 28 is shown as a structural unit having a coupling mechanism main body 320 in which coupling grooves 321 are formed, which coupling mechanism main body 320 serves for supporting functional elements of the coupling mechanism 300, specifically a handle 310 and a rocker 311 connected thereto, and which coupling mechanism main body 320 can be mounted to the front end of the auxiliary drive device main body 120.

It is to be noted that in a further embodiment the functions of the coupling mechanism main body 320 can be realized by respective elements formed in the same manner which elements according to this embodiment are part of the auxiliary drive device main body 120. In other words, it is possible to design the coupling mechanism main body 320 and the auxiliary drive device main body 120 as an integrated unit.

The coupling grooves 321 are formed basically V-shaped in order to facilitate insertion of a coupling pin 381 which is preferably formed cylindrical. The coupling pin 381 is an embodiment of an element to be held in a positive-locking manner in order to effect the coupling. It is understood that such an element to be kept in a positive-locking manner in order to effect the coupling can also have different shapes and can be formed in a different way. The coupling pin 381 described in connection with the present embodiment can be formed in two parts and can be attached at both sides of a coupling clamp 380 which can be attached removably at an axis 501 of a wheelchair 500 (see FIG. 1 and FIG. 2). In case a wheelchair does not have such an axis, a corresponding component (not shown) which fulfils the supporting function of the axis for such coupling clamp 380 can also be provided as a separate component and attached to the wheelchair, for instance by respective bolts.

Figure 24:
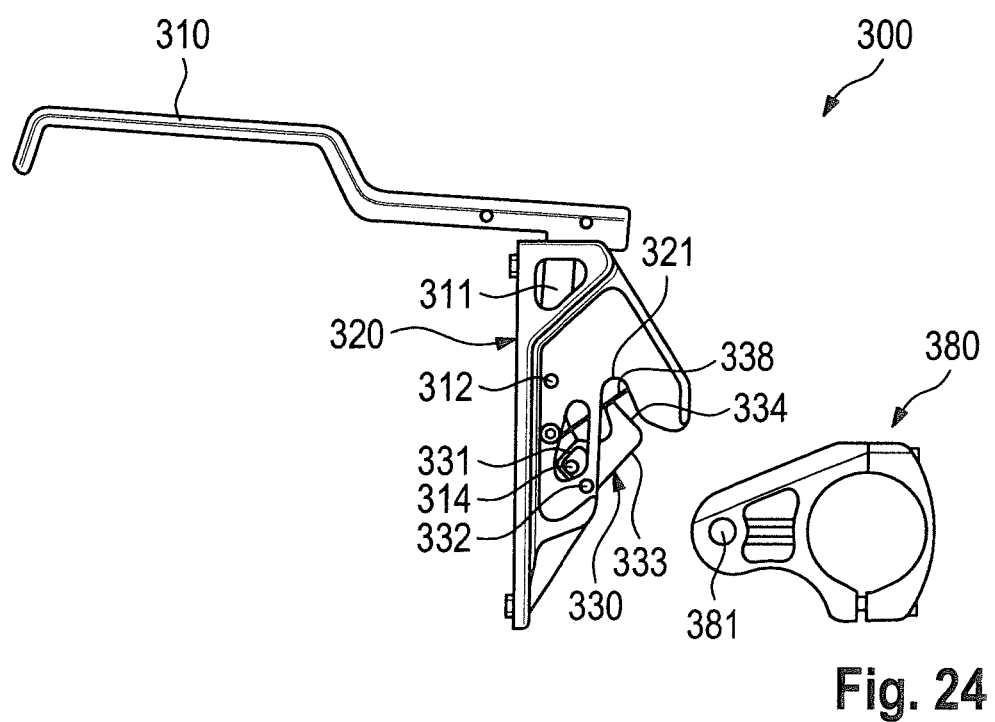
FIG. 24 is a side view of a coupling mechanism of an embodiment of an auxiliary drive device for a wheelchair together with a wheelchair coupling element in a ready to be coupled position.
Figure 25:
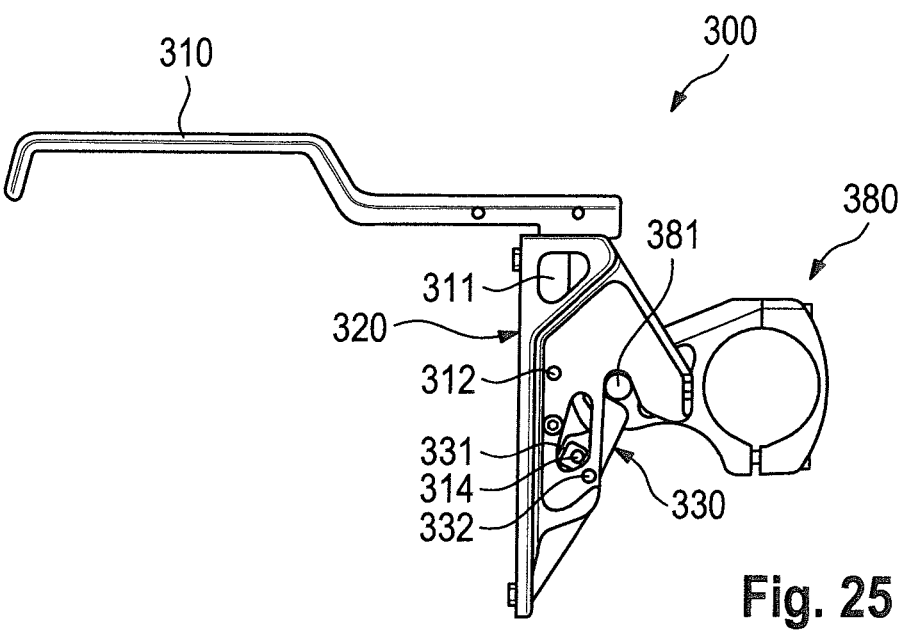
FIG. 25 is a side view of the coupling mechanism according to FIG. 24 in a locked position.
Figure 26:
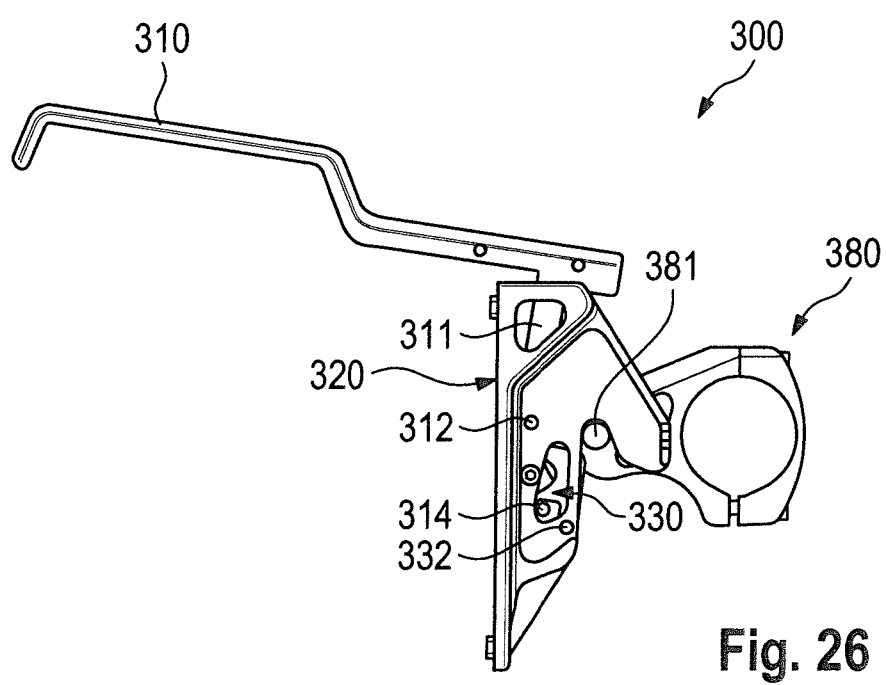
FIG. 26 is a side view of the coupling mechanism according to FIGS. 24 and 25 in a release position.

The rocker 311 is firmly and rigidly connected to the handle 310 and supported via a rocker support pin 312 in the coupling mechanism main body 320 such that it can be rotated over a certain angular range around the center axis of the rocker support pin 312 and in particular can assume positions between a locked operational position shown in FIG. 25 and a release position shown in FIG. 26 with a ready to be coupled position in between and shown in FIG. 24.

Bores 313 are formed in both sides of the rocker 311 which each hold an operating pin 314 which, when the coupling mechanism 300 is in a condition mounted ready to be operated, extend through a gate window 331 of a locking element 330 which is supported via a locking element support pin 332 in the coupling mechanism main body 320 and biased by a leg spring 338 in a clockwise direction, the term clockwise being based on the plane of depiction of FIGS. 24 to 26.

The locking element 330 is moveably supported in the coupling mechanism main body 320. In a locked position it allows locking in a positive-locking manner in which the auxiliary drive device 100 is coupled to the wheelchair 500 and the locking element 330 can be brought in a release position by operating the handle 310 in which release position uncoupling of the auxiliary drive device 100 from the wheelchair 500 is possible. The locking element 330 is formed such that it can, in a spring loaded manner, in the embodiment as shown via the leg spring 338, close the coupling groove 321 completely or at least partially. In other words, in the locked position the locking element prevents that a coupling pin 381 inserted into the coupling groove 321 can move out of the coupling groove 321.

Figure 27:
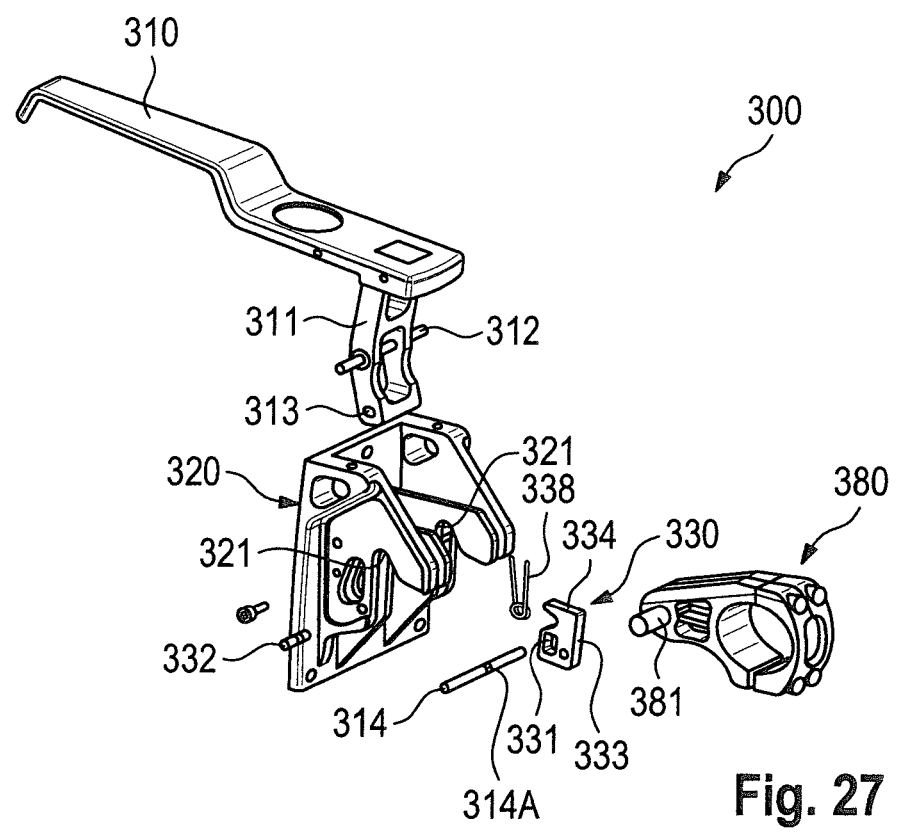
FIG. 27 is an exploded perspective view of the coupling mechanism according to FIGS. 24 to 26.
Figure 28:
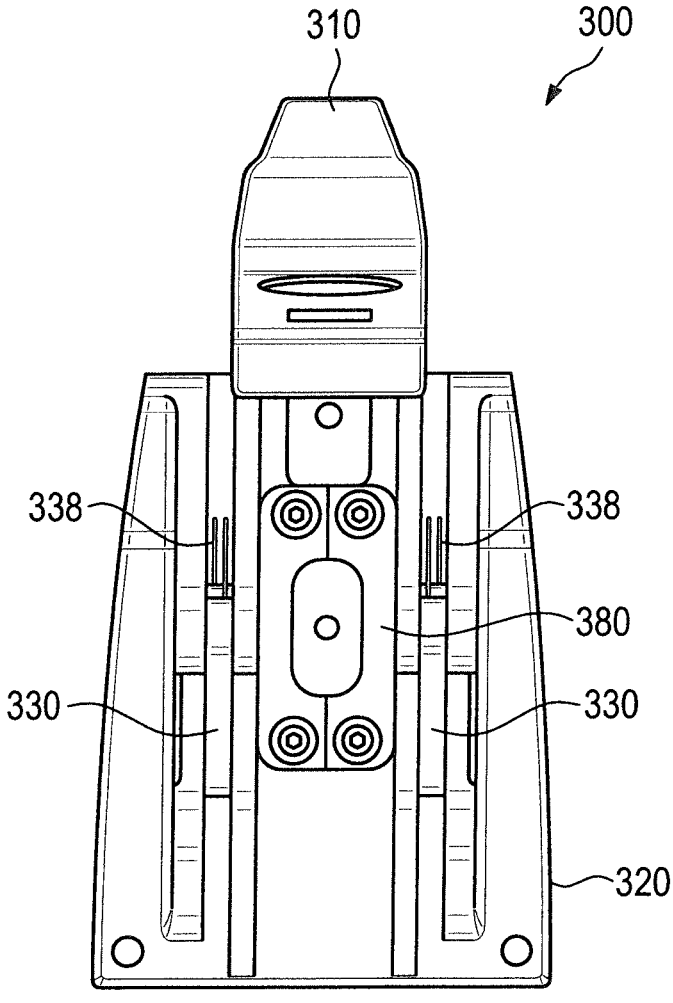
FIG. 28 is a rear view of the coupling mechanism according to FIGS. 24 to 27.

FIG. 28, in connection with FIG. 27, shows the symmetrical structure of the coupling mechanism 300 having two locking elements 330 and, correspondingly, two leg springs 338. Basically, provision of one locking element 330 and one leg spring 338 is sufficient. The redundant embodiment having two locking elements 330 and two corresponding leg springs 338 shown in the figures provides single fault safety.

Coupling Mechanism (Coupling and Uncoupling)

The functions and the interaction as well as details of the design of respective elements of an embodiment of the coupling mechanism 300 are explained in the following in connection with the process of coupling and uncoupling of an embodiment of an auxiliary drive device 100 to and from a wheelchair 500.

First, a coupling clamp 380 is attached at an axis 501 of a wheelchair 500, preferably in the center between both rear wheels, or, if the wheelchair 500 does not have such an axis 501, for instance because it is a so-called folding wheelchair having a lateral folding mechanism having cross struts, at a corresponding accessory axis (not shown) which is provided for this purpose and can be mounted to the wheelchair. The mounting of the coupling clamp 380 can be achieved for instance by a clamp mechanism.

The height of the coupling pin or, in case of a redundant design having two coupling pins 381, of the coupling pins which these pins have above the road or the ground, that is the vertical distance of the pin or the pins with respect to the plane on which the wheels of the wheelchair 500 stand, is of particular relevance. This height has an impact on the driving geometry of the auxiliary drive device 100 and, accordingly, on the drivability, especially concerning the position of the steering shaft 130 which in an ideal case should be vertical with respect to the surface on which the wheelchair stands. A particular influence concerning this height has the diameter of the rear wheels 502R, 502L of the wheelchair which in trade typically is for instance 24" or 25" and which, specifically depending on the chosen tires, leads to an effective diameter of the wheel from 595 mm to 620 mm or 620 mm to 645 mm, respectively. A further major factor in this respect is the position at which the accessory axis (not shown) is attached to the wheelchair.

Naturally, a person skilled in the art has several options for providing such adjustment. In one exemplary embodiment, adjustment can be provided by means of various steering forks 131 in different length. However, in order to reduce the number of different versions, in one embodiment a fork can be provided with two or more bores or a slotted fork can be provided, i.e. a fork having an elongated hole in which a so called flip-chip can be inserted which allows two or more different attachment heights. Furthermore, different versions of the coupling clamp 380 can be provided in order to address varying heights of the attachment and the proper height of the coupling pin 381 can be set and checked by using a caliber or gauge.

When a coupling clamp 380 is attached at the wheelchair 500 and the coupling pin 381 or the coupling pins 381 are adjusted in the proper height, the wheelchair 500 is ready for coupling of the auxiliary drive device 100. Firstly, the coupling mechanism of the auxiliary drive device 100 is in the coupling ready position as shown in FIG. 24. In this coupling ready position, the locking element 330, biased by the force of the leg spring 338 and limited by the abutment of the operating pin 314 in an angle of the gate window 331 correspondingly formed for this purpose, takes an end position with respect to pivoting around the center axis of the locking element support pin 332 in a clockwise direction, based on the drawing plane in the depictions according to FIGS. 24 to 26, which plane is also the indication of direction for the following description.

In this coupling ready position, no further rotation or pivotal movement of the locking element 330 can be effected by operation of the handle 310. Accordingly, the handle 310 in so far assumes a firm position with respect to the auxiliary drive device main body 120 which allows that the auxiliary drive device 100 can be lifted and carried by using the handle 310 in order to place it over the coupling pin 381 so that, when the auxiliary drive device 100 is lowered, the coupling pin 381 enters into the coupling groove 321 and rotates the locking element 330 by contact at a first locking element contact surface 333 against the spring force of the leg spring 338 in a counter clockwise direction around the center axis of the locking element support pin 332. This rotation is made possible by a corresponding design of the gate window 331.

When the coupling pin 381 has completely entered into the coupling groove 321, the coupling pin 381 has come into contact with a correspondingly formed button of the coupling groove 321 and hereby partly releases the locking element 330 so that the locking element 330, due to the spring force of the leg spring 338, is rotated in a clockwise direction around the center axis of the locking element support pin 332 to an extent that a second locking element contact surface 334 gets in contact with the coupling pin 381. This rotation is made possible by a corresponding design of the gate window 331. Due to this, the coupling pin 381 is held in the coupling groove 321 in a positive-locking manner and the auxiliary drive device 100 is ready to be operated and safely coupled to the wheelchair 500 in the locked operation position of the coupling mechanism 300 as shown in FIG. 25 while tilting or tipping of the wheelchair 500 is still possible.

The locking element 330 is designed such that during the coupling process, namely when this process is successfully terminated, it strikes, in a spring-biased manner, an element which is to be held in a positive-locking manner for effecting the coupling. In one embodiment, the element to be held in a positive-locking manner for effecting the coupling is the coupling pin 381. This strike produces a metallic sound.

In the embodiment as described here, this principle striking is realized in that after release of the locking element 330, when the coupling pin 381 has passed the first locking element contact surface 333, the locking element 330 flips back under the effect of the leg spring 338 until it strikes on the second locking element contact surface 334 of the coupling pin 381 whereby a metallic sound is produced in the form of a click or clack in a simple way, specifically without providing additional structural elements. This metallic sound is an acoustic feedback for the full, complete and safe coupling process. This is of particular advantage in cases where the coupling process is executed by a person sitting in the wheelchair who, from this position, can conduct an optical check regarding the coupling only with great difficulty or not at all.

The interaction of the leg spring 338, the locking element 330 and its geometric design, specifically with respect to the point of rotation around the center axis of the locking element support pin 332, the gate window 331 and the two locking element contact surfaces 333 and 334 as well as the coupling groove 321 allow a safe, secure and backlash-free three point support of the coupling pins 381 which also is able to compensate tolerances and wear. Particularly in connection with a drive system having a freely pivotable drive wheel 110, a backlash-free connection of the auxiliary drive device 100 and the wheelchair 500 is of particular importance.

A tendency of the coupling pin 381 to move downwards, that is in the direction to the aperture of the V-shaped coupling groove 321 due to the specific geometric design, specifically the shape and orientation of the second locking element contact surface 334 with respect to the shape of a coupling groove 321 and the position of the point of rotation of the locking element 330 around the center axis of the locking element support pin 332, has the effect that the torque of the locking element 330 around the center axis of the locking element support pin 332 in a clockwise direction is increased and the clamping force is also further increased. This further enhances safety against unintended uncoupling.

An intended uncoupling of the auxiliary drive device 100 from the wheelchair 500 conducted by an operating person is effected in that the handle 310 of the coupling mechanism 300 is pulled upward and, by doing so, it is rotated in a clockwise direction, together with the rocker 311, around the center axis of the rocker support pin 312. This has the effect that the operating pin 314, due to respective engagement in the correspondingly designed gate window 331 of the locking element 330, rotates the locking element 330 around the center axis of the locking elements support pin 332 in an anti-clockwise direction so that the coupling groove 321 is unblocked.

In the release position shown in FIG. 26, the auxiliary drive device can be lifted by means of the handle 310 and uncoupled from the wheelchair 500. The direction in which power has to be exerted for unlocking the lock and lifting the auxiliary drive device 100 for uncoupling it from the wheelchair 500 by means of the handle 310 are practically identical so that the unlocking and uncoupling process can be easily and smoothly effected by one simple move of the hand. In other words, the operation of the handle 310 which moves the locking element 330 in the unlocking position has the same direction of force as carrying the auxiliary drive device 100 by means of the handle 310.

Upon releasing the handle 310, this and the locking element 330, due to the force of the leg spring 338, return to the coupling ready position according to FIG. 24.

Adaption and Adjustment of the Operating Satellite

In connection with the explanation of the structure and the functions of the operating satellite 200, specific features including the adjustable ratchet sensitivity have already been addressed. Further explanation is given in the following.

The ratchet upon rotating the rotational control ring 203 provides an audible ratchet sound and a tactile feedback via the hand of the operating person by means of a correspondingly selected encoder like, for example, an encoder type E33, provided by the company ELMA.

As far as software is concerned, the sensitivity of the ratchet distance of the rotation control ring 203, i.e. the interrelation between one increment of turning and the effect on the speed, can be individually set via an end terminal like a smart phone or a PC, namely by a smartphone app or a PC service application. This makes it possible to address the needs of various user groups as well as their level of handicap. For instance, it can be desirable to provide only a very small change in speed in spite of a considerably large distance of the movement of operation. This is of considerable advantage for users having limited coordination ability of their arms and hands since the movements then can be executed in a gross motor manner.

On the other hand, in case of good fine motor skills and for well-trained users, it can be of advantage if already a movement over a small distance leads to a comparatively great change of the speed. This is particularly useful when driving outdoors where it may be intended to obtain the top speed quickly.

Exemplary values for a the effect of "ratchet" (or a click), i.e. a distinct increment of rotation, can be taken from table 1 below.

| Change of speed per ratchet | Set sensitivity: |
| --- | --- |
| 0.1 km/h | low |
| 0.2 km/h | high |
| 0.3 km/h | |
| 0.4 km/h | |
| 0.5 km/h | |
| 0.6 km/h | |
| 0.7 km/h | |
| 0.8 km/h | |
| 0.9 km/h | |
| 1.0 km/h | |

Figure 29:
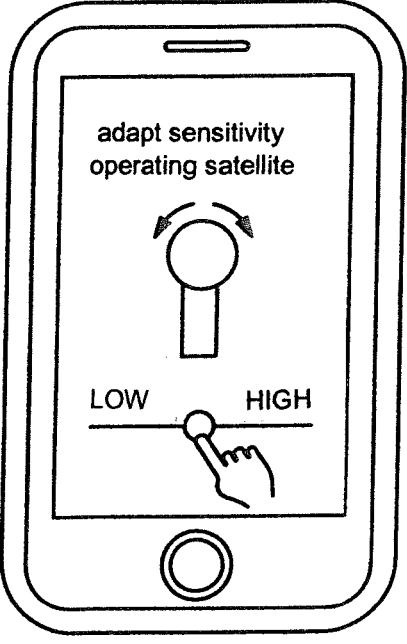
FIG. 29 is a depiction of a display of a smartphone arranged for adjusting the sensitivity of a rotational control ring.

FIG. 29 shows a display of a smartphone arranged for setting and adjusting the sensitivity of the rotational control ring 203 of the operating satellite 200. The sensitivity can be set between low and high by means of an electronic sliding controller.

Setting of the Automatic Adaption of the Cornering Speed

As already explained in connection with the description of the structure of an embodiment of an auxiliary drive device 100, a sensor can be adapted at the steering shaft 130 of the auxiliary drive device 100 which sensor permanently monitors the steering angle of the drive wheel 110.

In such case, a setting can be made as from which angle on the drive power shall be reduced or increased. In one embodiment, this can be done for instance via a computer program or a smartphone app. By reducing the drive power in tight curves, controllability and ultimately the safety will be increased because the cornering speed will be automatically reduced. Specifically, those wheelchair drivers having a higher spinal paralysis and limited function of the hands and fingers therefore gain additional control concerning the drive.

In a narrow environment like for instance indoors, where for instance furniture or other objects must be avoided, or while driving in heavily frequented pedestrian zones as well as generally in narrow curves, monitoring the steering angle is an additional safety feature because the drive power is appropriately reduced. When the steering angle becomes smaller again and finally becomes zero, i.e. a straight drive, the drive power is increased correspondingly.

In a further embodiment, as a specific safety feature, the drive may be completely switched off as soon as a critical steering angle is reached, for instance in case a steering angle is larger than 55° to the left side or the right side which gives, in this example, a total rotational range of 110°.

In order to effect such a programming concerning the drive characteristics, the auxiliary drive device 100 is coupled with a respective end terminal, for instance a personal computer or smartphone, by use of a Bluetooth module. On this computer or smartphone, a respective software application for this additional drive features has been installed. In one embodiment, a computer can be connected with the auxiliary drive device 100 via a cable, for instance a USB cable, and programming can be effected via cable connection.

Figure 30:
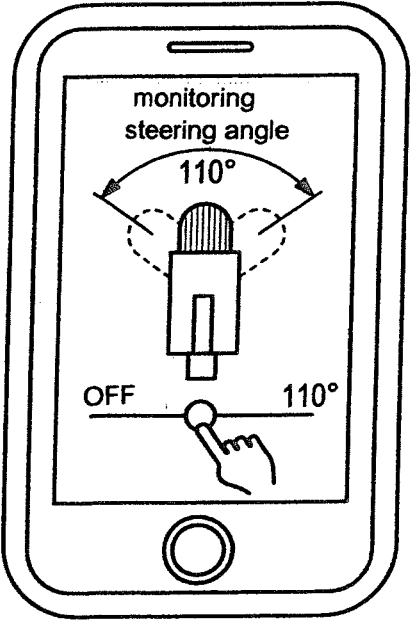
FIG. 30 is a depiction of a display of a smartphone arranged for setting an automatic adaption of the travelling speed when negotiating a curve in dependence of the steering angle of the drive wheel.

FIG. 30 shows, in an exemplary depiction, a display of a smartphone arranged for setting the automatic adaption of the cornering speed depending on a steering angle of the drive wheel 110. Monitoring of the angle can be completely switched off or can be set up to a maximum value of for instance 110° by use of an electronic slide controller.

It is understood that also other settings and switching on or off operations can be effected by such an external device, for instance switching ON and OFF of the rear light 122. Furthermore, such an app can display operational parameters like for instance the state of charge of the main battery 121 or of the operating satellite battery on the smartphone.

The control functions of the described embodiments make use of electronic control elements, wherein respective components are arranged in particular in the operating satellite 200, in the auxiliary drive device main body 120 and in the drive wheel 110.

The control functions can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of the control functions. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the control functions.

Although some example embodiments of the technology are described hereinabove, the foregoing example embodiments are mere examples and are not intended to limit the scope of the technology. It should be appreciated that modifications and alterations of the foregoing example embodiments may be made. It should be also appreciated that various omissions, replacements, and modifications may be made in the foregoing example embodiments described herein, without departing from the scope of the spirit of the technology. The technology is intended to include such modifications and alterations in so far as they fall within the scope of the appended claims or the equivalents thereof.

LIST OF REFERENCE SIGNS 100 auxiliary drive device
105 steering shaft rotational angle sensor
110 drive wheel
111 motor
112 tire surface
113 tire surface bolts
118 slip ring
120 auxiliary drive device main body
121 main battery
122 rear light
123 main switch
124 main body charging socket 130 steering shaft
131 steering fork
132 stop gliding element—guiding element
133 elongated hole
134 stop gliding element
135 stop element
135A first side of stop element 135
135B second side of stop element 135
200 operating satellite
201 undercut
202 operating satellite control portion
203 rotational control ring
204 push control knob
205 display device
205A LED element white
205B LED element RGB
206 cover element
207 fixing screw
208 grip link
209 unlocking element
210 operating satellite mounting element
211 locking hook
218 adapter charging socket
219 pairing button
220 operating satellite mounting pivot element
221 latches
221A latch bar
222 fixing hook
223 release button
224 push rod
225 pressure spring
226 reverse lever
230 wheelchair mounting element
231 mounting bolt
300 coupling mechanism
310 handle
311 rocker
312 rocker support pin
313 operating pin receiving bore
314 operating pin
320 coupling mechanism main body
321 coupling groove
330 locking element
331 gate window
332 locking element support pin
333 first locking element contact surface
334 second locking element contact surface
338 leg spring
380 coupling clamp
381 coupling pin
500 wheelchair
501 axis
502L left rear wheel
502R right rear wheel
504 pushrim
505 front wheel

The invention claimed is:

1. An auxiliary drive device for a wheelchair, comprising:
at least one electrically driven drive wheel;
an electronic control unit for controlling the functions of the auxiliary drive device;
a coupling mechanism for coupling the auxiliary drive device to a wheelchair; and
an operating satellite for controlling the auxiliary drive device, the operating satellite being adapted to be attached to the wheelchair and comprising:

an operating satellite control portion and an operating satellite mounting element;
a display device provided on the outer side of the operating satellite and displaying information regarding operational conditions of the auxiliary drive device;
an operating satellite control unit having electric and electronic components and adapted to perform bidirectional communication between the operating satellite and said electronic control unit for controlling the functions of the auxiliary drive device,
wherein the display device is designed such that its arrangement on the operating satellite is adjustable such that it is made possible to adjust a position of the display device with respect to its visibility for a person sitting in the wheelchair in connection with a respective place of attachment of the operating satellite at the wheelchair,
wherein the display device is attached to an outer circumference of the satellite control portion,
wherein the outer circumference of the operating satellite control portion is rotatable with respect to the operating satellite mounting element and fixed in a position ensuring that the display device is within sight of the person sitting in the wheelchair, and
wherein the display device and a control element of the operating satellite are adapted to rotate coaxially.

2. The auxiliary drive device according to claim 1, wherein the operating satellite has a push control knob for controlling specifically ON and OFF functions and a rotational control ring for initiating drive and selection of a driving speed.

3. The auxiliary drive device according to claim 1, wherein the outer circumference of the operating satellite control portion is adapted to be fixed in a position ensuring that the display device is within sight of the person sitting in the wheelchair by one or more fixing screws.

4. The auxiliary drive device according to claim 3, wherein a cover element is provided at a side face of the operating satellite control portion, the cover element is adapted to be removed and fixed back into place by operating a spring-loaded unlocking element and wherein removing the cover element allows access to the one or more fixing screws.

5. The auxiliary drive device according to claim 4, wherein removing the cover element allows access to at least one of an adaptor charging USB socket and a Bluetooth pairing button.

6. The auxiliary drive device according to claim 1, wherein the auxiliary drive device comprises a rechargeable main battery provided in an auxiliary drive device main body and the operating satellite comprises a rechargeable operating satellite battery provided in the operating satellite, and
wherein the display device displays information regarding a state of charge of the rechargeable main battery and regarding a state of charge of the rechargeable operating satellite battery.

7. The auxiliary drive device according to claim 6, wherein the display device displays information regarding the state of charge of the rechargeable main battery by providing a strip of several LED elements wherein the number of lighted elements corresponds to the state of charge, and
wherein regarding the state of charge of the rechargeable operating satellite battery an LED element provided which communicates the state of charge of the rechargeable operating satellite battery by changing color.

8. The auxiliary drive device according to claim 1, further comprising a wheelchair mounting element adapted to be attached to the wheelchair, wherein the operating satellite further comprises an operating satellite mounting pivot element which is adapted to be attached to the wheelchair mounting element in various positions;

wherein the operating satellite control portion has control and switching elements by which via respective actuation processes, performed by the person sitting in the wheelchair, the control and drive of the auxiliary drive device can be achieved, and wherein the operating satellite control portion is adapted to be attached to the operating satellite mounting pivot element via the operating satellite mounting element by a quick release unit.

9. The auxiliary drive device according to claim 8, wherein the operating satellite mounting pivot element is adapted to be connected to the wheelchair mounting element in a rotational position which can be freely determined, and wherein the operating satellite mounting pivot element can be fixed in this freely determinable position by a mounting bolt.

10. The auxiliary drive device according to claim 1, further comprising a plurality of fixing screws which allow i) rotation of the outer circumference of the operating satellite control portion when the fixing screws are in a loosened state and ii) fixation of the outer circumference of the operating satellite control portion when the fixing screws are in a tightened state.

\* \* \* \* \*